US006802367B1

(12) United States Patent
Westbrooks, Jr. et al.

(10) Patent No.: US 6,802,367 B1
(45) Date of Patent: Oct. 12, 2004

(54) RETHERMALIZATION SYSTEM AND METHOD FOR USE WITH FOOD TRAYS HAVING A HOT FOOD SIDE AND A COLD FOOD SIDE

(75) Inventors: John W. Westbrooks, Jr., Christiana, TN (US); Warren Frye, Jr., Murfreesboro, TN (US); Christopher Shea Curry, Fayetteville, TN (US)

(73) Assignee: Standex International Corporation, Salem, NH (US)

( * ) Notice: Subject to any disclaimer, the term of this patent is extended or adjusted under 35 U.S.C. 154(b) by 153 days.

(21) Appl. No.: 10/020,011

(22) Filed: Dec. 13, 2001

(51) Int. Cl.[7] .............................................. F25B 29/00
(52) U.S. Cl. ........................ 165/201; 165/261; 165/288; 165/58; 165/918; 165/919; 99/483; 62/443
(58) Field of Search ................................ 165/201, 254, 165/261, 202, 288, 48.1, 58, 918, 919; 99/483; 62/443

(56) References Cited

U.S. PATENT DOCUMENTS

| | | | |
|---|---|---|---|
| 4,852,365 A | | 8/1989 | Elrod et al. |
| 5,159,973 A | * | 11/1992 | Pennington et al. ....... 165/48.1 |
| 5,201,364 A | * | 4/1993 | Tippmann et al. ...... 165/918 X |
| 5,393,960 A | * | 2/1995 | Beizermann ............ 165/918 X |
| 5,449,232 A | | 9/1995 | Westbrooks, Jr. et al. |
| 5,454,427 A | | 10/1995 | Westbrooks et al. |
| 5,655,595 A | | 8/1997 | Westbrooks, Jr. |
| 5,771,959 A | | 6/1998 | Westbrooks, Jr. et al. |
| 5,797,445 A | | 8/1998 | Westbrooks, Jr. et al. |
| 5,839,291 A | * | 11/1998 | Chang |
| 5,868,195 A | | 2/1999 | Westbrooks, Jr. |
| 5,896,915 A | | 4/1999 | Westbrooks, Jr. et al. |
| 6,059,196 A | * | 5/2000 | Miyazaki et al. ....... 165/918 X |
| 6,073,547 A | | 6/2000 | Westbrooks, Jr. et al. |
| 6,105,818 A | | 8/2000 | Speranza |
| 6,315,039 B1 | | 11/2001 | Westbrooks, Jr. et al. |

* cited by examiner

Primary Examiner—L V Ciric
(74) Attorney, Agent, or Firm—Luedeka, Neely & Graham PC

(57) ABSTRACT

A rethermalization system for food trays having a hot food side and a cold food side, the system includes a first thermal system having a heating source, a refrigeration coil and a blower; a second thermal system having first and second refrigeration coils and a blower; and a control system operable in one mode to activate the refrigeration coil of the first thermal system and the first refrigeration coil of the second thermal system, and operable in a second mode to activate the heating source of the first thermal system and the first and second refrigeration coils of the second thermal system.

22 Claims, 21 Drawing Sheets

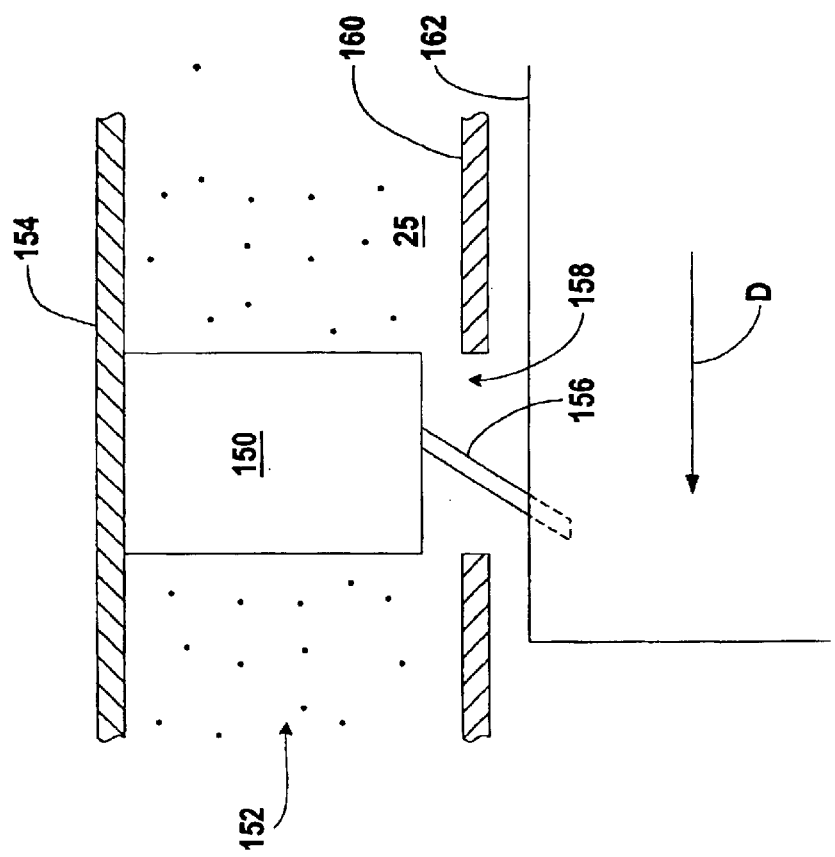
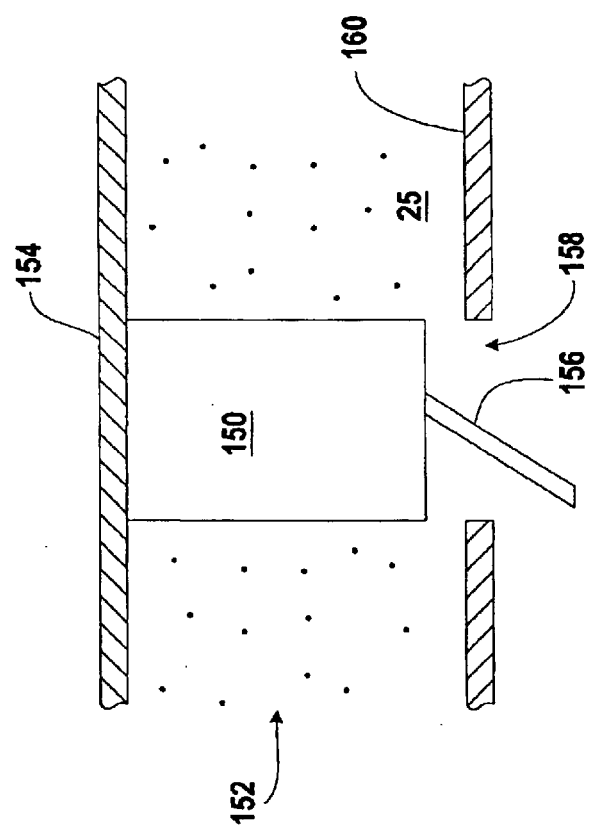

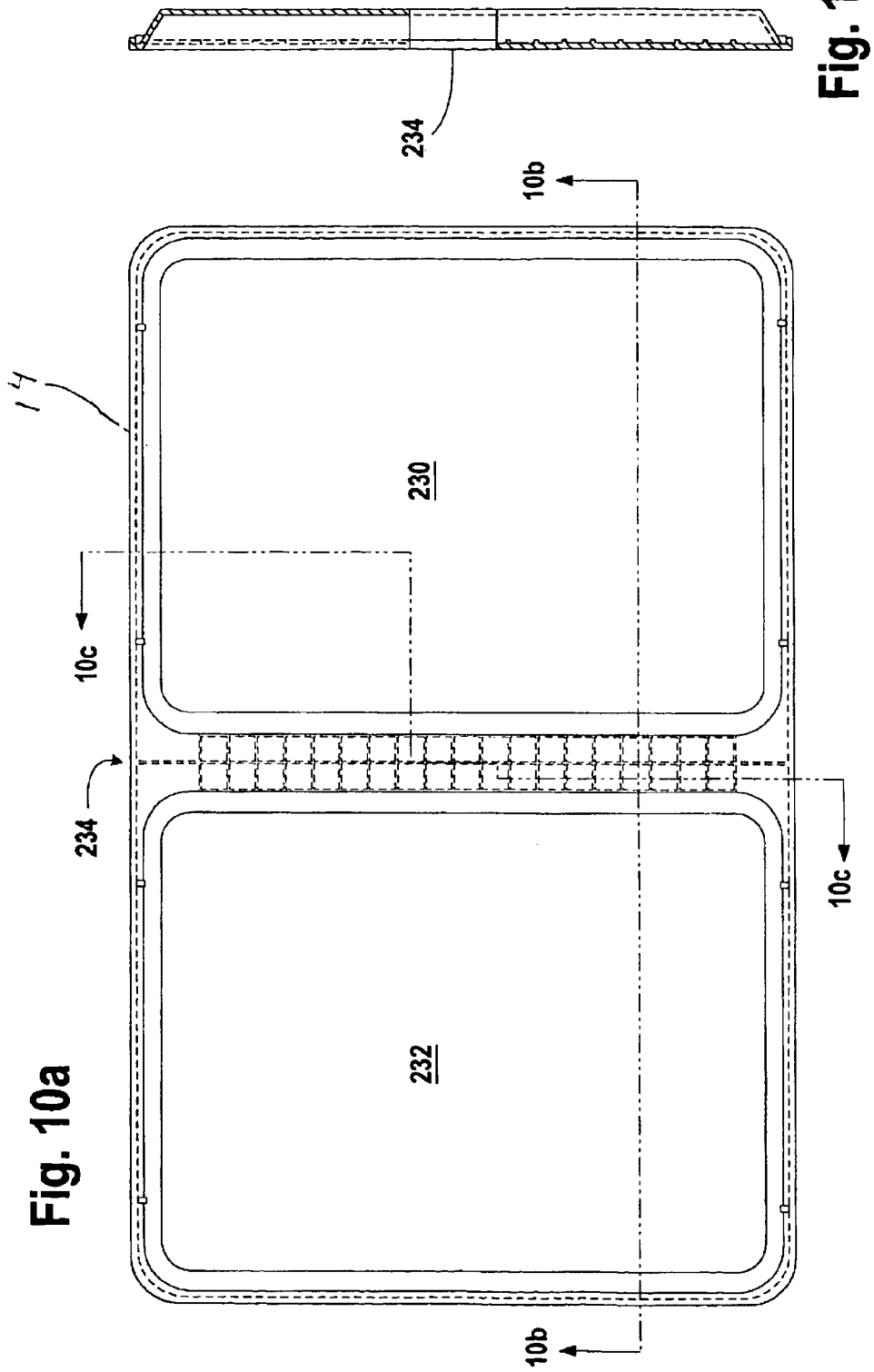
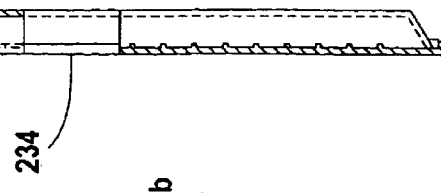
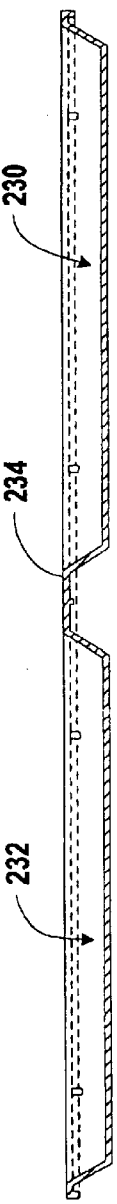
Fig. 10a
Fig. 10b
Fig. 10c

RETHERMALIZATION SYSTEM AND METHOD FOR USE WITH FOOD TRAYS HAVING A HOT FOOD SIDE AND A COLD FOOD SIDE

FIELD OF THE INVENTION

This invention relates generally to food rethermalization. More particularly, this invention relates to systems and methods for refrigerating, reheating, and serving prepared meals in an institutional setting.

BACKGROUND AND SUMMARY OF THE INVENTION

Food rethermalization units are used by institutions, such as hospitals, to store prepared trays of food in a refrigerated state. The trays generally have an area for storing cold-served foods, e.g, milk, fruit, salads, and the like, and an area for storing hot-served foods, e.g., entrees, potatoes, vegetables, and the like. The units maintain the foods in a refrigerated state and have a rethermalization capability wherein hot-served foods are reheated to a desired serving temperature prior to their being served.

The present invention is directed to a rethermalization system for use with food trays having a hot side and a cold side. The system is operable to maintain both the hot side and the cold side of each tray at a cold temperature and of heating the hot side from the cold temperature to a hot temperature while simultaneously maintaining the cold side at the cold temperature.

In a preferred embodiment, the system includes a plurality of food trays, each tray having a cold food side and a hot food side, and a rethermalization unit having a first compartment accessible via a first end and configured for being loaded with the trays. A first thermal system is located adjacent a first interior side of the rethermalization unit so that when the trays are received within the first compartment the hot food side of each tray is directly adjacent the first thermal system for thermal treatment thereby. A second thermal system is located adjacent a second interior side of the rethermalization unit so that when the trays are received within the first compartment the cold food side of each tray is directly adjacent the second thermal system for thermal treatment thereby.

A compressor system is operatively associated with the first and second thermal systems. A microprocessor-based control system controls operation of the first and second thermal systems and the compressor system to effect desired thermal treatment of food on the food trays.

In one aspect of the invention, the first thermal system includes a heating source, a refrigeration coil, and a blower for circulating heat from the heating source and cold from the refrigeration coil. The second thermal system preferably includes first and second refrigeration coils and a blower for circulating cold from the first and second refrigeration coils. The control system is operable so as to activate the refrigeration coil of the first thermal system and the first refrigeration coil of the second thermal system and to deactivate the second refrigeration coil of the second thermal system when the rethermalization system is operated to maintain both the hot side and the cold side of each tray at a desired cold temperature. The control system is further operable to deactivate the refrigeration coil of the first thermal system, activate the heating source of the first thermal system, and activate both the first and second refrigeration coils of the second thermal system when the rethermalization system is operated to heat the hot side from the desired cold temperature to a desired hot temperature while simultaneously maintaining the cold side at the desired cold temperature.

In another aspect, the system includes a cassette configured for receiving the plurality of the trays and a cassette placement sensor located within the rethermalization unit. The sensor is operatively associated with the control system for sensing initial placement of the cassette within the rethermalization unit. The control system initiates operation of the first and second thermal systems when the cassette is placed in the rethermalization unit to maintain both the hot side and the cold side of each tray at a desired cold temperature.

In yet another aspect, the system includes a compressor system temperature monitor and/or a compressor pressure monitored associated with the compressor system for sensing temperatures and/or pressures associated with the operation of the compressor system. The monitors are operatively associated with the control system for inputting temperature and/or pressure information thereto relating to the compressor system. When the temperature or the pressure of the compressor system exceeds a predetermined value the control system generates a signal to cease operation of the compressor system.

In still another aspect, the system includes a cassette configured for receiving the plurality of the trays, a first portage unit, and a second portage unit. The first and second portage units are each configured for receiving the cassette and for transferring the cassette to the first compartment and for removing the cassette from the first compartment of the rethermalization unit.

The rethermalization unit includes a first latch pin adjacent the first compartment and the first portage unit has a first end including a first latch system releasably engageable with the first latch pin (and a latch pin of the second portage unit). The second portage unit has first and second opposite ends, the first end of the second portage unit having a second latch system releasably engageable with the first latch pin and a second latch pin releasably engageable with the first latch system of the first portage unit. If desired, a plurality of the second portage units may be connected to one another via their receptive latch systems and latch pins.

The invention also relates to a method for rethermalizing food trays having a hot side and a cold side to maintain both the hot side and the cold side of each tray at a cold temperature for a desired period of time and thereafter heating the hot side from the cold temperature to a hot temperature while simultaneously maintaining the cold side at the cold temperature,.

In a preferred embodiment, the method includes the steps of providing a plurality of food trays, each tray having a cold food side, a hot food side and providing a rethermalization unit configured for being loaded with the trays, the rethermalization unit having a first thermal system including a heating source and a refrigeration source, and a second thermal system including first and second refrigeration sources.

The rethermalization system is preferably initially operated to maintain both the hot side and the cold side of each tray at a desired cold temperature by activating the refrigeration source of the first thermal system and the first refrigeration source of the second thermal system and deactivating the second refrigeration source of the second thermal system. The rethermalization system is subsequently operated to heat the hot side from the desired cold temperature to a desired hot temperature while simultaneously maintaining the cold side at the desired cold temperature by deactivating the refrigeration source of the first thermal system, activating the heating source of the first thermal system, and activating both the first and second refrigeration sources of the second thermal system.

In a further aspect, the method involves the steps of providing a rethermalization unit configured for being loaded with the trays, the rethermalization unit having a thermal system to selectively provide heating and cooling to the unit, a cassette configured for receiving the plurality of the trays, and a cassette placement sensor for sensing initial placement of the cassette within the rethermalization unit, and sensing when the cassette is initially placed in the rethermalization unit and initiating operation the thermal system to maintain both the hot side and the cold side of each tray at a desired cold temperature when the cassette is placed in the rethermalization unit.

In yet another aspect, the invention relates to a method for handling food trays to be selectively refrigerated and rethermalized.

In a preferred embodiment, the method includes the steps of providing a plurality of food trays, providing a cassette configured for receiving the plurality of the trays; providing a rethermalization unit configured for being loaded with the trays, providing a plurality of portage units selectively interconnectable to one another and each portage unit being configured for receiving the cassette and for transferring and removing the cassette from the rethermalization unit, loading the trays on the cassette and loading the cassette onto a first one of the portage units, interconnecting the portage unit loaded with the cassette to a second of the portage units, transferring the cassette loaded with the trays from the first one of the portage unit to the second one of the portage units while the portage units are interconnected, and connecting the second one of the portage units to the rethermalization unit and transferring the cassette loaded with the trays from the second one of the portage units to the rethermalization unit

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

FIGS. 8a and 8b are cross-sectional views showing a docking sensor of the unit of FIG. 2.

FIGS. 10a–10c are views of a tray having a hot food section and a cold food section for use with the system of FIG. 1.

DETAILED DESCRIPTION

Figure 1:
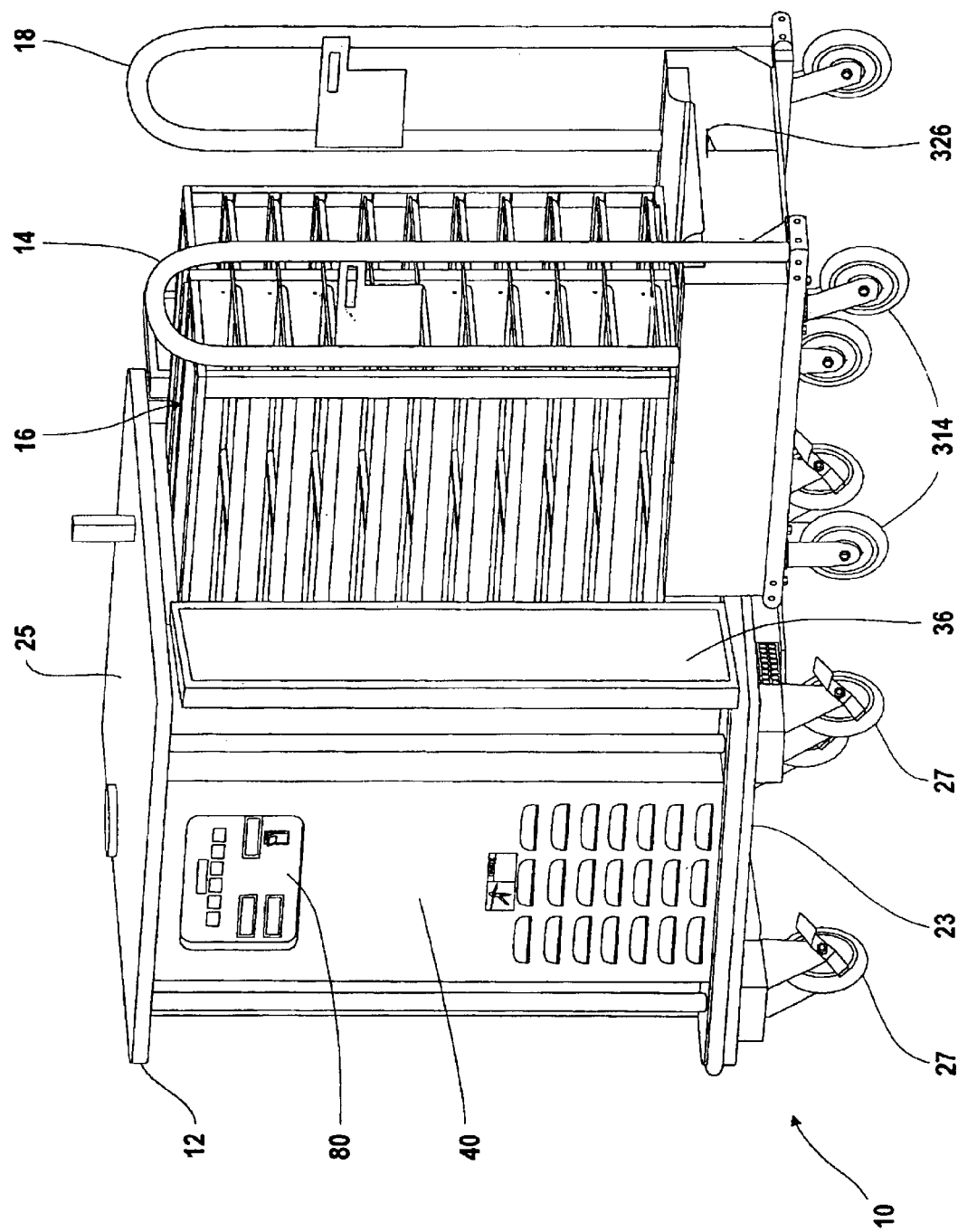
FIG. 1 is a perspective view of a rethermalization system in accordance with a preferred embodiment of the invention.
Figure 18:
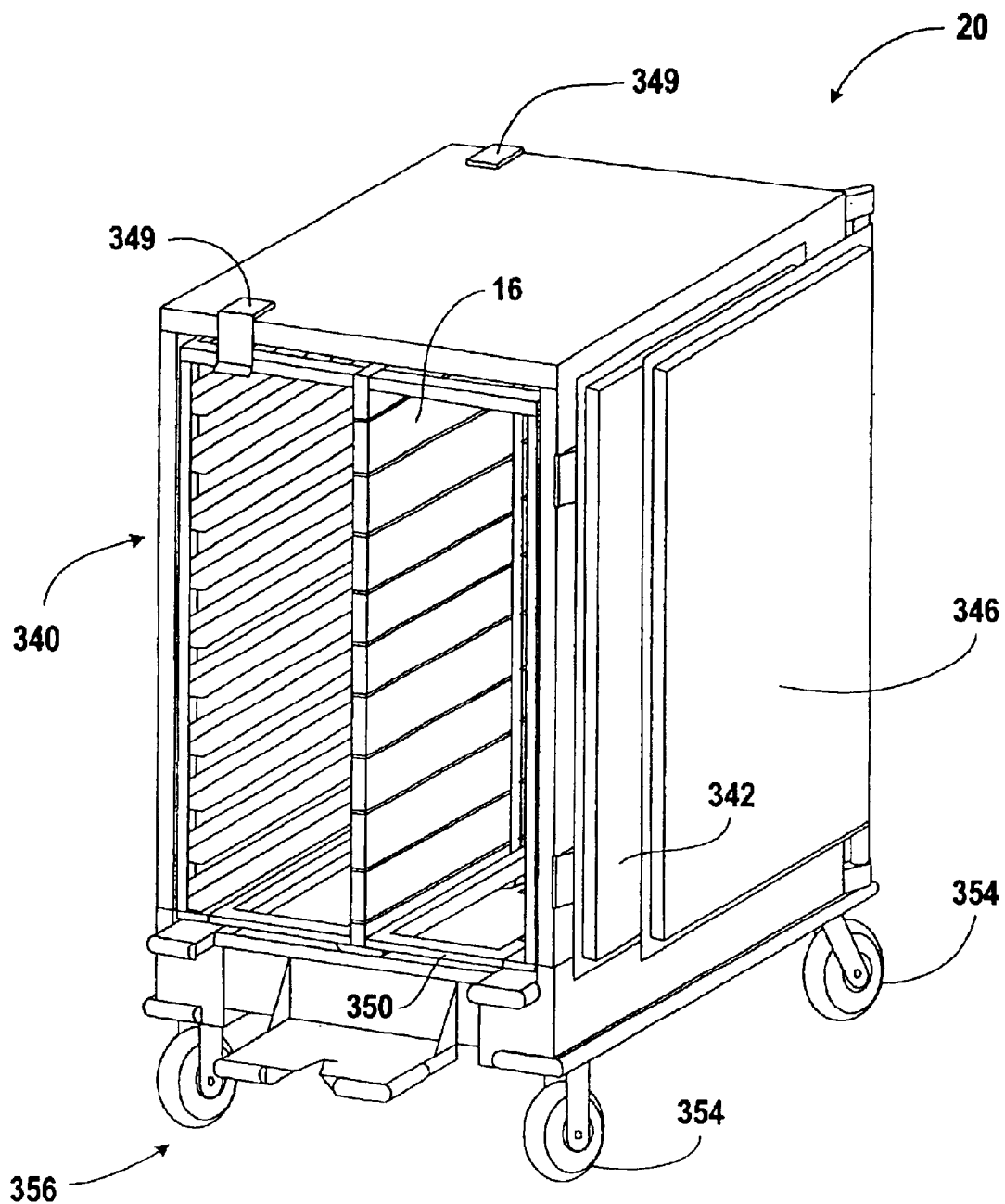
FIG. 18 is a perspective view showing an enclosed transport for transporting the cassette.

With reference to FIG. 1, the embodiment relates to a rethermalization system 10 having a rethermalization unit 12, a plurality of food trays 14, a tray cassette 16, and a portage units such as open dolly 18 and/or enclosed transport 20 (FIG. 18).

The rethermalization unit 12 is computer controlled and has heating and cooling capabilities. Food prepared in an institutional kitchen, for example, is placed on respective hot and cold sides of the trays 14. The trays 14 are thereafter loaded on the cassette 16 which is received on the dolly 18 or the transport 20.

Portage units such as the dolly 18 (or transport 20) is used to transport the tray-loaded cassette to the rethermalization unit 12 located, for example, on a patient floor of the institution remote from the kitchen. The tray-loaded cassette is then transferred to the rethermalization unit 12.

The rethermalization unit 12 maintains the trays in a refrigerated state until a predetermined time or until it is desired to initiate reheating. At that time, food items that are to be served hot are reheated to an appropriate temperature while cold items are maintained at a refrigerated temperature. The cassette 16 may be transferred to the dolly 18 or transport 20 for travel to patient rooms. The trays 14 may be individually removed from the cassette 16 for service of the food to patients. Likewise, trays 14 may be collected for transport to a cleaning facility.

Rethermalization Unit 12

Figure 2:
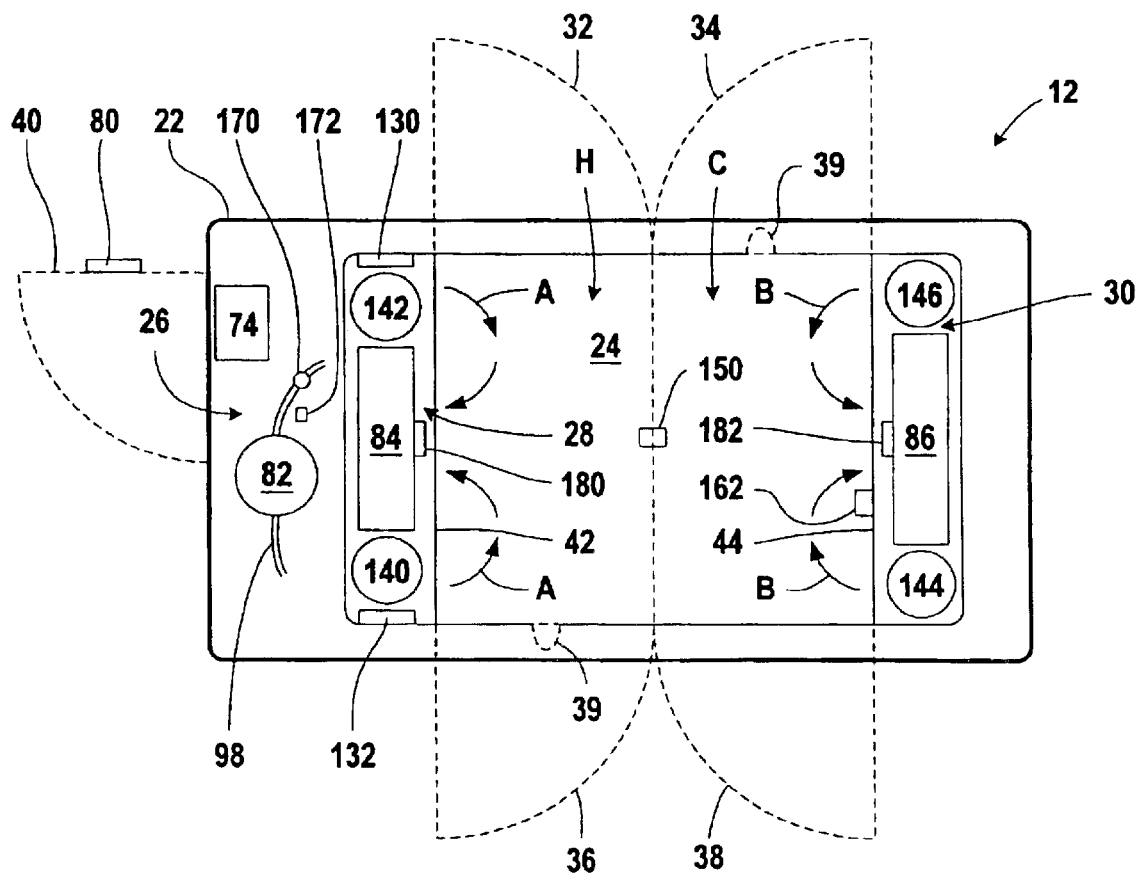
FIG. 2 is a top view of a rethermalization unit of the system of FIG. 1.

With reference to FIG. 2, the rethermalization unit 12 includes a housing 22 having a cassette compartment 24, a systems compartment 26, and thermal compartments 28 and 30. The housing, doors, panels and other structural materials of the unit 12 are preferably made of stainless steel materials. The compartment 24 has a floor 31 that is substantially smooth to facilitate rolling of the cassette 16 thereon for loading and unloading of the cassette.

The housing 22 is preferably substantially rectangular in configuration and further includes a bottom 23 and top 25.

Wheels 27 are located adjacent the bottom 23 to render the unit 12 mobile. It will be understood that one or more portions of the housing 22 may be of double-walled construction with insulation provided within the walls.

The cassette compartment 24 is sized to receive the cassette 16 and is accessible as by insulated double rear doors 32, 34 and double front doors 36, 38 located on opposite sides of the compartment 24 and having suitable gaskets to inhibit thermal leakage. The cassette compartment 24 is a continuous opening, but for discussion herein will be understood to have a "cold side" indicated generally by reference character C and a "hot side" indicated generally by reference character H.

A docking pin 39 is preferably located on the bottom 23 adjacent each set of doors for enabling docking of the dolly 18 and transport 20 thereto during loading and unloading of cassettes. The pin 39 is preferably identical to the latch pin 359 described for the transport 20 and depicted in FIG. 20.

The systems compartment 26 is accessible as by vented door 40 on the end of the unit 12 adjacent the compartment 26. The systems compartment 26 is preferably thermally insulated from the cassette compartment 24 and includes suitable venting, fans, and the like to avoid excessive temperatures therein.

The compartments 28 and 30 are adjacent to the compartment 24 and located at opposite ends thereof. The compartments 28 and 30 are separated from the compartment 24 as by removable vented panels 42 and 44, respectively. The panels 42 and 44 are configured, respectively, to allow air to flow freely between the compartment 28 and the compartment 24, and between the compartment 30 and the compartment 24 as described more fully below.

Figure 3:
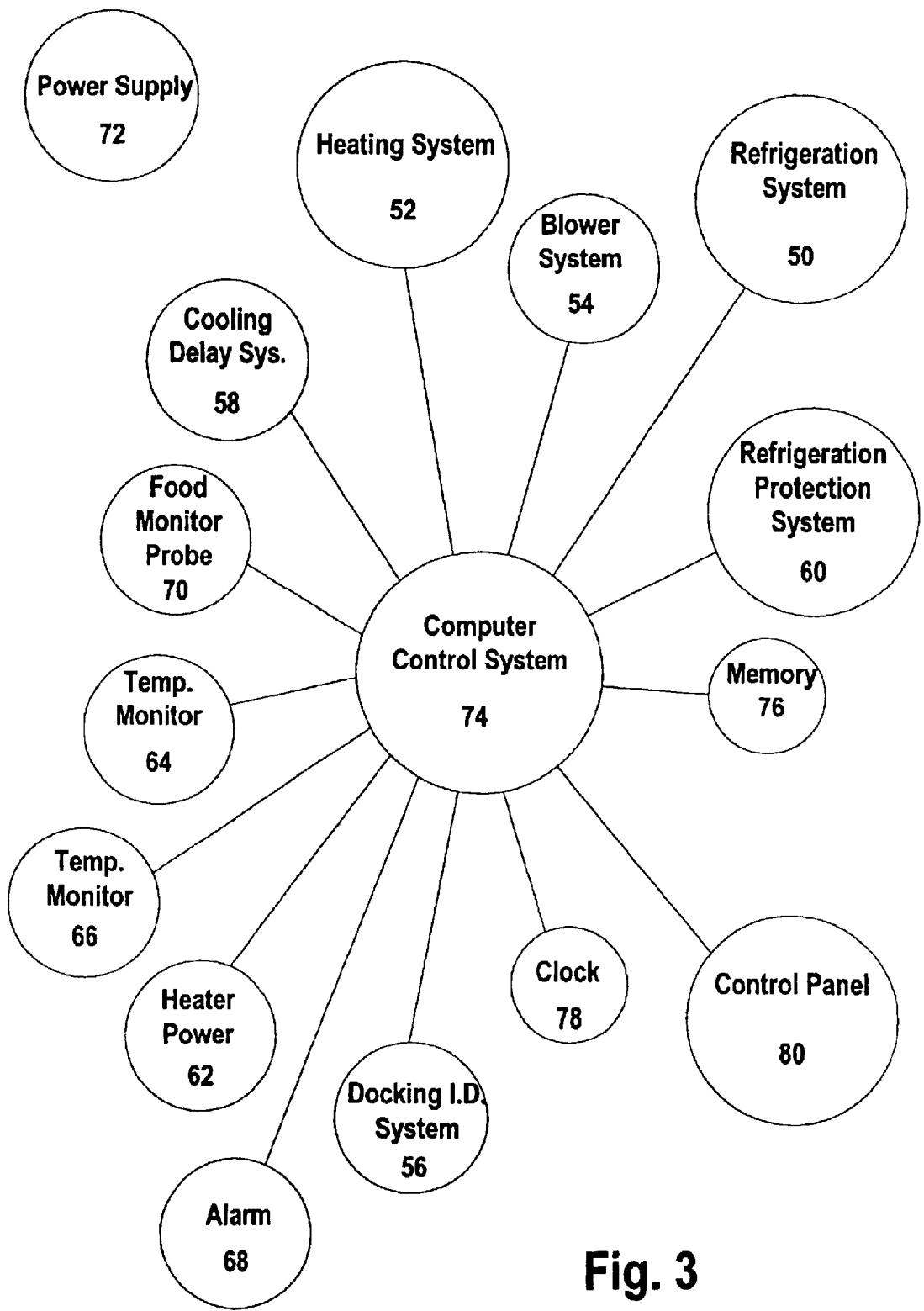
FIG. 3 is a functional block diagram of the rethermalization unit of FIG, 2.

With reference to FIG. 3, there is shown a functional block diagram of the rethermalization unit 12. Accordingly, and in a preferred embodiment, the unit 12 includes refrigeration system 50, heating system 52, blower system 54, docking identification system 56, cooling delay system 58, refrigeration protection system 60, heater power leads 62, temperature monitors 64 and 66, alarm 68, and food monitor probe 70. Power for operating the rethermalization system is supplied as by power supply 72. Operation of the rethermalization system is controlled as by a microprocessor-based computer control system 74 having associated memory 76, clock 78, and control panel 80.

Figure 4:
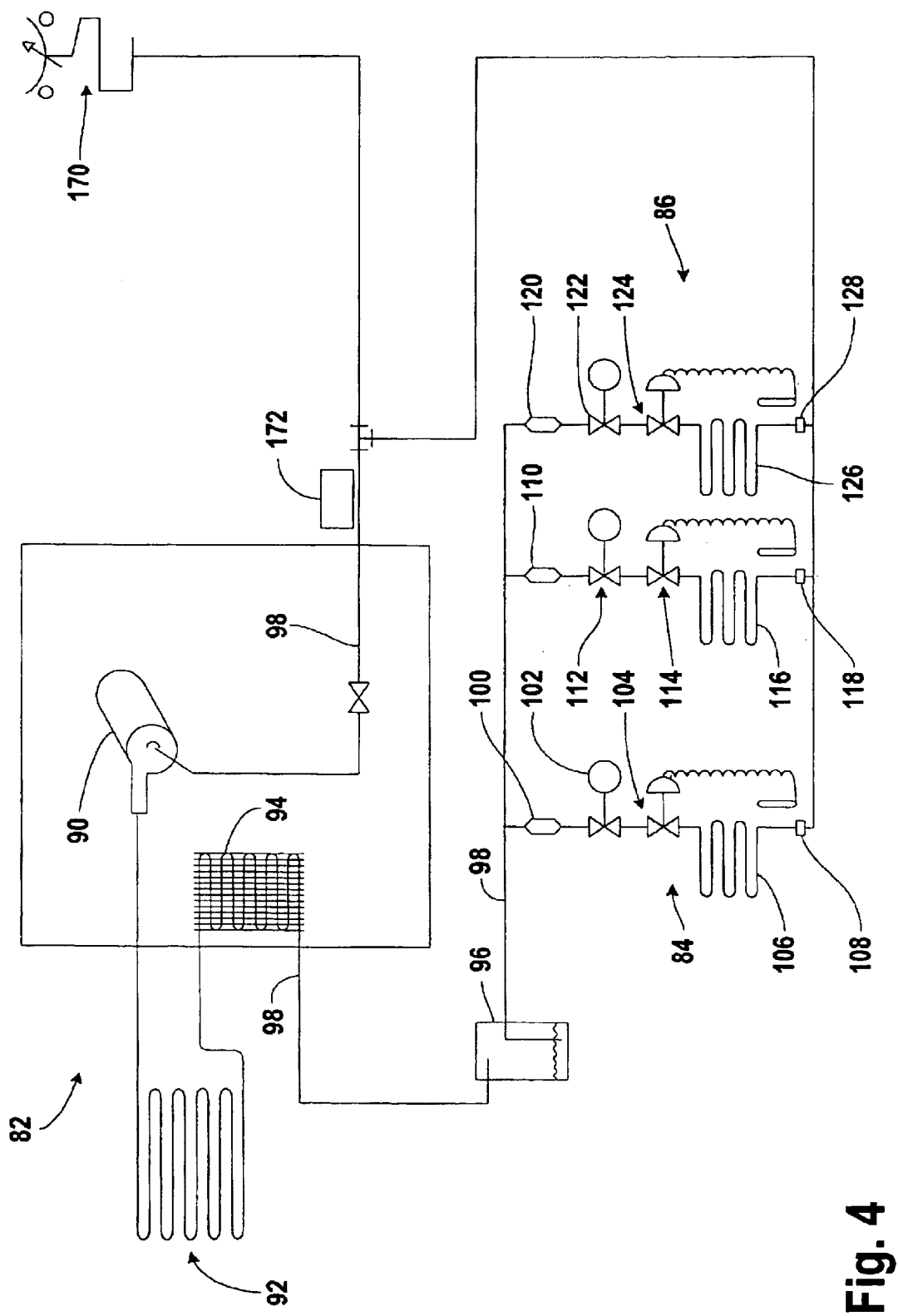
FIG. 4 is a diagram of a refrigeration system for the rethermalization unit of FIG. 2.

Returning to FIG. 2 and with additional reference to FIG. 4, the refrigeration system 50 preferably includes a compressor system 82, a hot side coil system 84, and a cold side coil system 86.

The compressor system 82 provides a refrigerant, such as R 134a, under pressure for selective travel through condensing coils associated with the hot side coil system 84 and the cold side coil system 86. Blowers associated with the blower system 54 cause air to travel between the coil systems 84 and 86 and the compartment 24 to provide cold air to the compartment 24 for convective cooling of food on the trays loaded on the cassette.

During selected times, both the hot side H and the cold side C of the compartment 24 are cooled. At other times, such as during reheating or rethermalization of hot food items, the cold side C continues to be cooled but the hot side H is heated instead. To facilitate this, the refrigeration system 50 is configured to cease cooling the hot side H during rethermalization of the hot side H and to increase the cooling capacity of the cold side C during rethermalization of the hot side H.

In this regard and with continuing reference to FIG. 4, the compressor system 82 preferably includes a compressor 90, condensing coil 92, heat exchanger 94, and receiver 96. The compressor is preferably at least about a 1 hp compressor for units sized to accommodate about 20 trays. The compressor system 82 is coupled to the coils systems 84 and 86 as by tubing 98.

The hot side coil system 84 is provided by a coil circuit having a filter/dryer 100, solenoid valve 102, expansion valve 104, evaporator coil 106, and check valve 108.

The cold side coil system 86 is provided by a pair of coil circuits. The first coil circuit includes a filter/dryer 110, solenoid valve 112, expansion valve 114, evaporator coil 116, and check valve 118. The second coil circuit includes a filter/dryer 120, solenoid valve 122, expansion valve 124, evaporator coil 126, and check valve 128.

During operation when both the hot side H and the cold side C of the compartment 24 are to be cooled, the compressor system 82 passes refrigerant through the evaporator coil 106 of the hot side coil system 84 and the evaporator coil 116 of the cold side coil system 86. Refrigerant is blocked from passage through the coil 126 as by the valves 122 and 128.

Just prior to and during the application of heat to the hot side H, the valves 102 and 122 are operated so that flow of refrigerant is ceased to the coil 106 and flow of refrigerant to the coil 126 is enabled. Accordingly, during rethermalization of the hot side H, the cooling applied to the cold side C is increased. This is advantageous to help counter any heat transferred to the cold side C from the hot side H during rethermalization.

In this regard, it is noted that the coils 106, 116, and 126 are preferably of substantially equal size so that the load on the compressor remains substantially constant during operation of the refrigeration system 50.

That is, the load on the compressor 90 is substantially the same when refrigerant is flowed through the coils 106 and 116 as it is when refrigerant is flowed through coils 116 and 126. This is advantageous to maintain substantially constant compressor load to facilitate longevity of the system.

Figure 5:
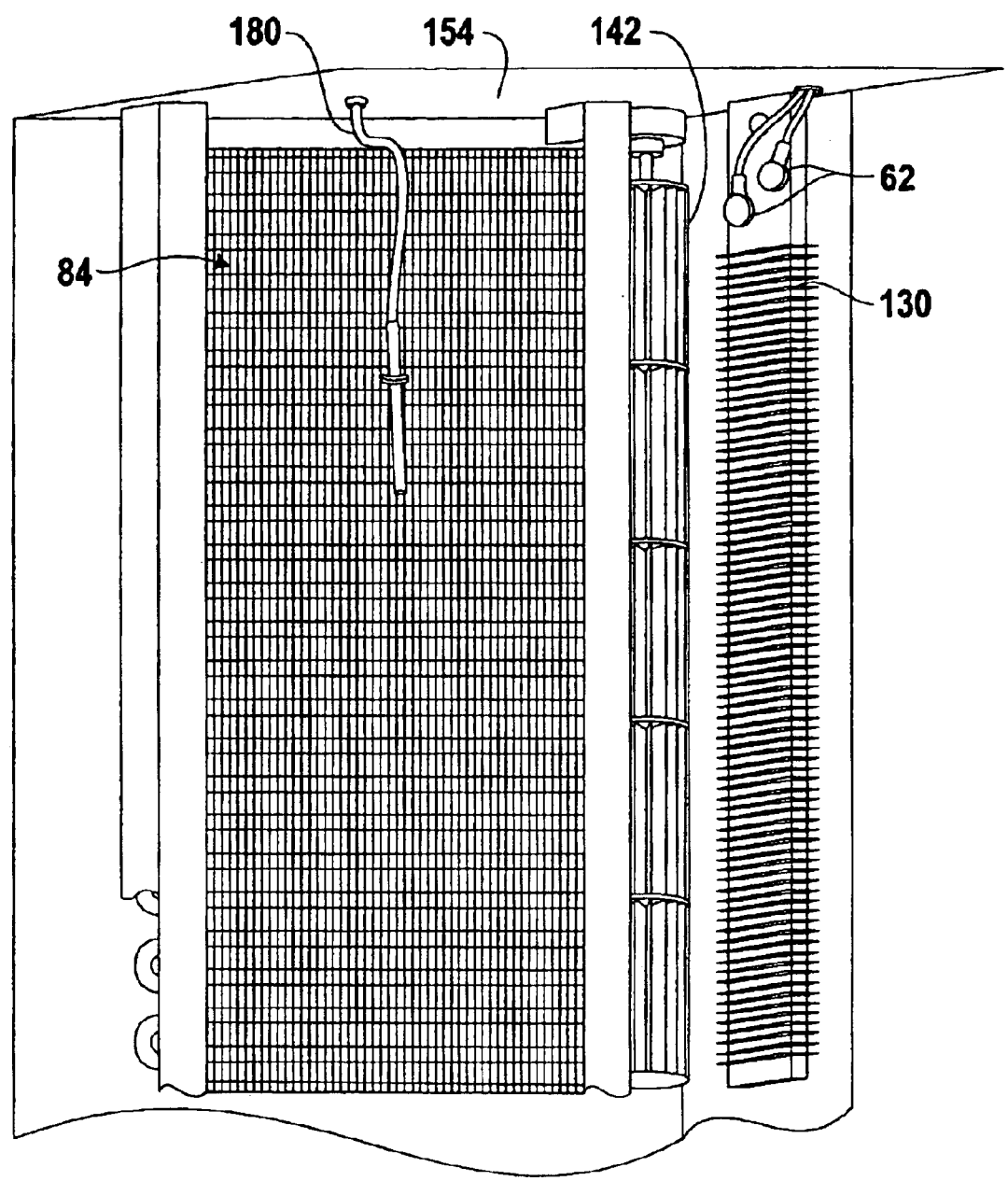
FIGS. 5 and 6 are interior views of a hot side of the unit of FIG. 2.
Figure 6:
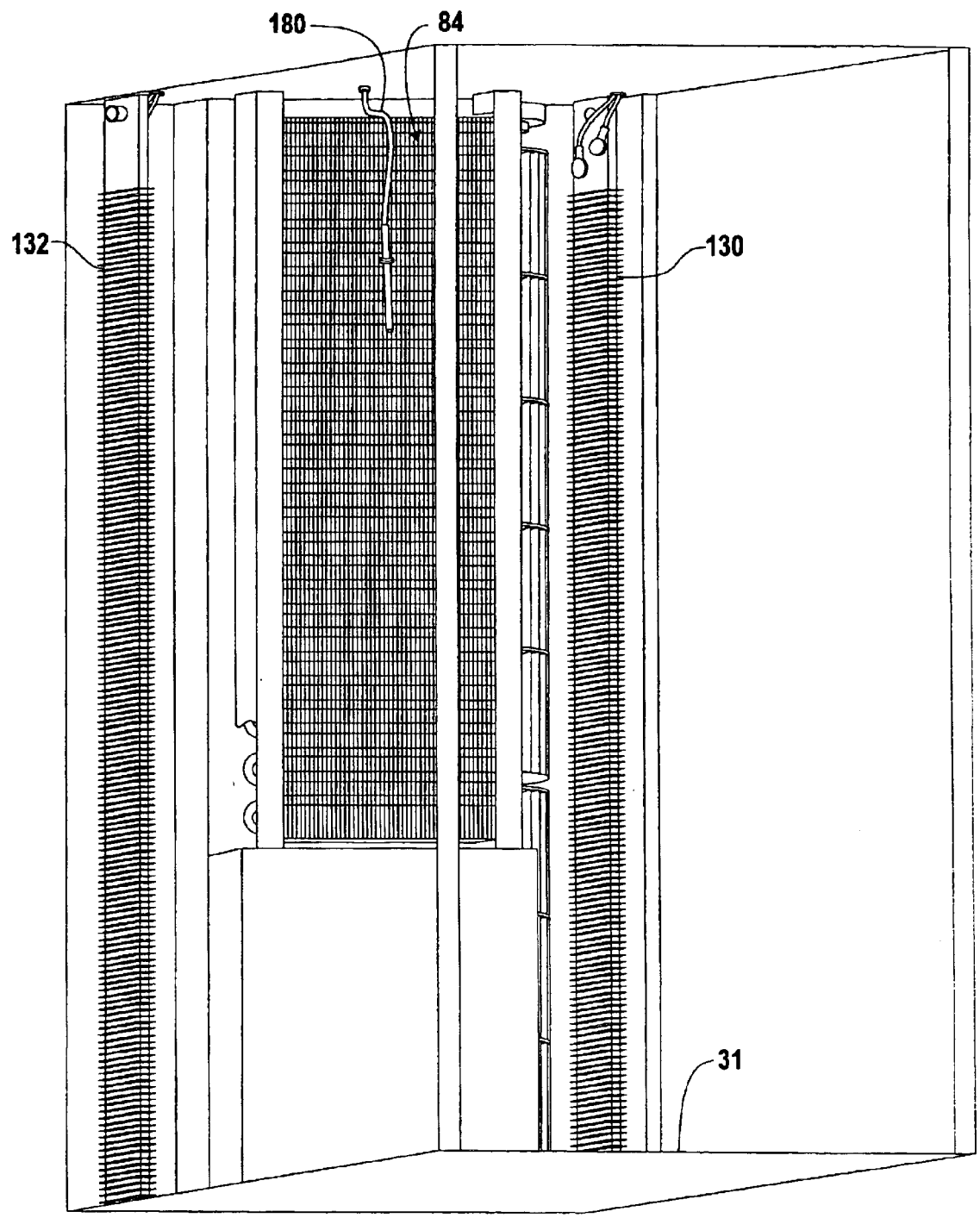
Figure 7:
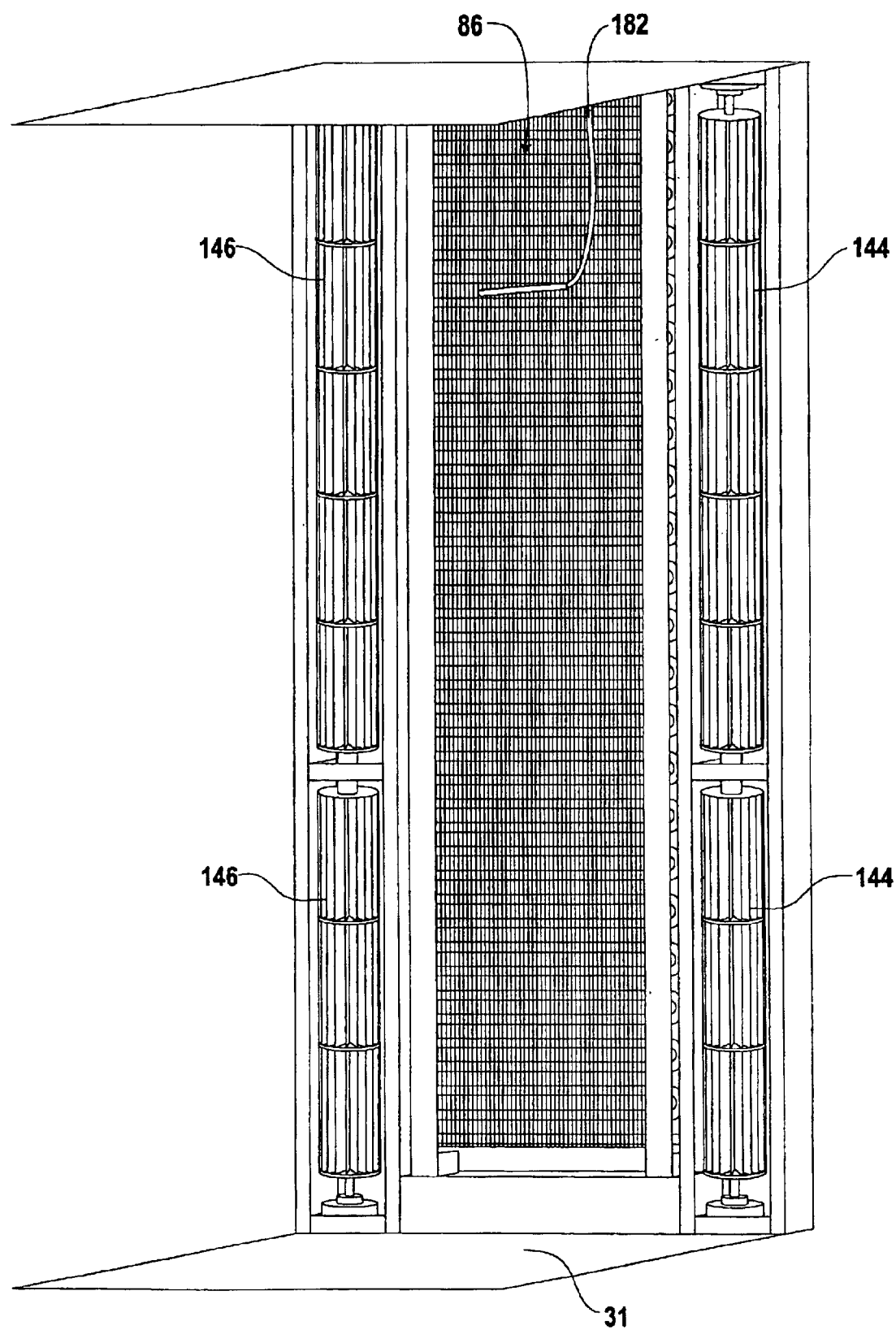
FIG. 7 is an interior view of a cold side of the unit of FIG. 2.

Returning to FIG. 2 and with reference to FIGS. 5 and 6, the heating system 52 preferably includes a pair of electrical heating sources 130 and 132 located adjacent the inner sidewall of the compartment 28. Each source 130 and 132 preferably extends substantially the height of the compartment 28. The heating sources 130 and 132 are preferably tubular metal sheathed resistance heaters having a digital temperature controller, with the metal sheath material preferably being made of a corrosion resistant metal alloy such as nickel alloys of the type available under the trade name INCOLOY.

Blowers associated with the blower system 54 cause air heated by the heating sources 130, 132 to travel between the compartment 28 and the compartment 24 to provide heated air to the compartment 24 for convective heating of food on the trays loaded on the cassette.

With reference to FIGS. 2 and 5–7, the blower system 54 preferably includes a pair of electrically powered blowers 140 and 142 located in the compartment 28, and electrically powered blowers 144 and 146 located in the compartment 30. Each blower 140–146 preferably is cylindrical and extends substantially the full length of the compartments 28 and 30. The full length configuration of the blowers advantageously provides substantially uniform convective air currents to the trays 14 on each side of the compartment 24.

Returning to FIG. 2, the blowers 140 and 144 are preferably configured to run clockwise, and the blowers 142 and 146 to run counter-clockwise. This results in air flow patterns corresponding generally to the arrows A on the hot side H and air flow patterns corresponding generally to the arrows B on the cold side C when the cassette 16 is installed in the unit 12 and the blowers are all operating.

With reference to FIGS. 8a and 8b, the docking identification system 56 is preferably provided as by an electrical sensor 150 located on the interior of a central portion of the top 25. The top 25 is preferably of double-walled construction having insulation 152 located there between.

The sensor 150 is preferably mounted to upper wall 154 of the top 25 of the unit 12. Button 156 of the sensor 150 extends downwardly through aperture 158 of lower wall 160 and into the compartment 24. The button 156 is preferably angled so as to extend in a direction away from a front side of the unit (associated with doors 36 and 38) through which the cassette 16 is preferably loaded, but may extend straight down as well. In this regard, the switch 150 is intended to switch "on" when the button 156 is contacted by the cassette 16 as it is being loaded into the unit 12.

When the cassette 16 is loaded in the direction of the arrow D, an upper portion 162 of the cassette 16 contacts and depresses the button 156 (FIG. 8b) and switch 150 is turned "on." This generates a signal to the control system 74 to issue a default command to initiate cooling within the compartment 24 as by activation of the blower system 54 and the refrigeration system 50 so that cold air is circulated through both the cold side C and the hot side H of the compartment 24. While switch 150 is illustrated as a toggle-type switch, it will be understood to represent various limit or contact switches or optical detector/switches, or proximity sensor/switches that detect the presence (or absence) of a cassette.

Returning to FIG. 2, the cooling delay system 58 is preferably provided as by a thermocouple or a resistive thermal detector 162 located on an interior wall of the compartment 24, and preferably adjacent the cold side C of the compartment 24. The detector enables information concerning the temperature of the compartment 24 to be obtained by the control system 74.

This enables the system 74 to override the default condition of initiating cooling within the compartment 24 when the cassette 16 is loaded into the compartment 24 if the temperature within the compartment 24 exceeds a predetermined threshold temperature, such as above about 110° F. The detector 162 further enables monitoring of the temperature of the compartment 24 so that cooling can be initiated once the temperature falls to below the threshold or after a suitable delay, i.e., after a predetermined amount of time has passed for cool down of the compartment 24.

For the purpose of example, the scenario can occur wherein trays for breakfast have just been rethermalized and removed for serving, and a cassette loaded with lunch trays placed in the unit 12. Since rethermalization has just been completed, it is likely that the compartment 24 may exceed the threshold temperature when the cassette is initially loaded.

The refrigeration protection system 60 preferably includes a pressure control sensor 170 or a thermocouple or a resistive thermal detector 172 or both Returning to FIG. 4, the control sensor 170 is preferably is preferably a pressure sensor located on the tubing 98 for sensing the pressure within the tubing. The sensor 170 may be located at any location on the portions of the tubing that always receive refrigerant during operation of the refrigeration system 50. The sensor 170 enables information concerning the pressure to be obtained by the control system 74. If the pressure exceeds a predetermined threshold, the control system 745 may sound an alarm and/or shut down the compressor.

The detector 172 enables information concerning the temperature within the tubing 98 to be obtained by the control system 74. If the temperature exceeds a predetermined threshold, the control system may sound an alarm and/or shut down the compressor. The detector 172 may be provided as by a thermocouple or a resistive thermal detector in contact with the tubing 98.

The thermal monitors 64 and 66 (FIG. 2) are preferably provided as by thermocouples or resistive thermal detectors 180 and 182 (FIGS. 5 and 7) mounted adjacent the coil systems 84 and 86 through which the air currents represented by the arrows A and B travel when the blowers are operating (FIG. 2). The detectors 180 and 182 enable information concerning the temperature of the air currents represented by the arrows A and B to be obtained by the control system 74.

The alarm 68 is preferably an audible buzzer or the like that can be activated by the control system 74 to audibly signal the completion of a cycle, the detection of undesirable conditions, or the like.

The food monitor probe 70 is preferably provided as by a movably positionable thermocouple or resistive thermal detector that can be used by an operator to obtain temperature information about food items in the unit. For example, prior to placing the cassette into the unit, the monitor can be inserted into a food item and the temperature information obtained. The control system can display this information to the operator or save the information to memory or both. This information can be repeated for other times during the storage or rethermalization cycle to facilitate quality control and record keeping.

The probe 70 is preferably placed in contact with a hot food item within the cassette to monitor a representative food temperature for comparison of that temperature by the control system 74 to a predetermined temperature. Thus, if at the end of the retherm cycle the minimum temperature is not reached, then the control system can enable additional heating to bring the food up to the desired temperature.

Electrical power requirements for the rethermalization unit are provided by the power supply 72. The power requirements for the refrigeration system and the heating system are preferably 208 volt, three-phase power. The rethermalization unit 12 preferably includes a cord for plugging the unit 12 directly to an appropriate wall outlet to supply electricity to the power supply.

The microprocessor-based computer control system 74 and associated memory 76 and clock 78 may be conventional microprocessor/memory/clock devices of a type well known in the art. The computer control system and associated memory 76 and clock may be programmed as by the control panel 80 to control operation of the various systems and display of information.

Figure 9:
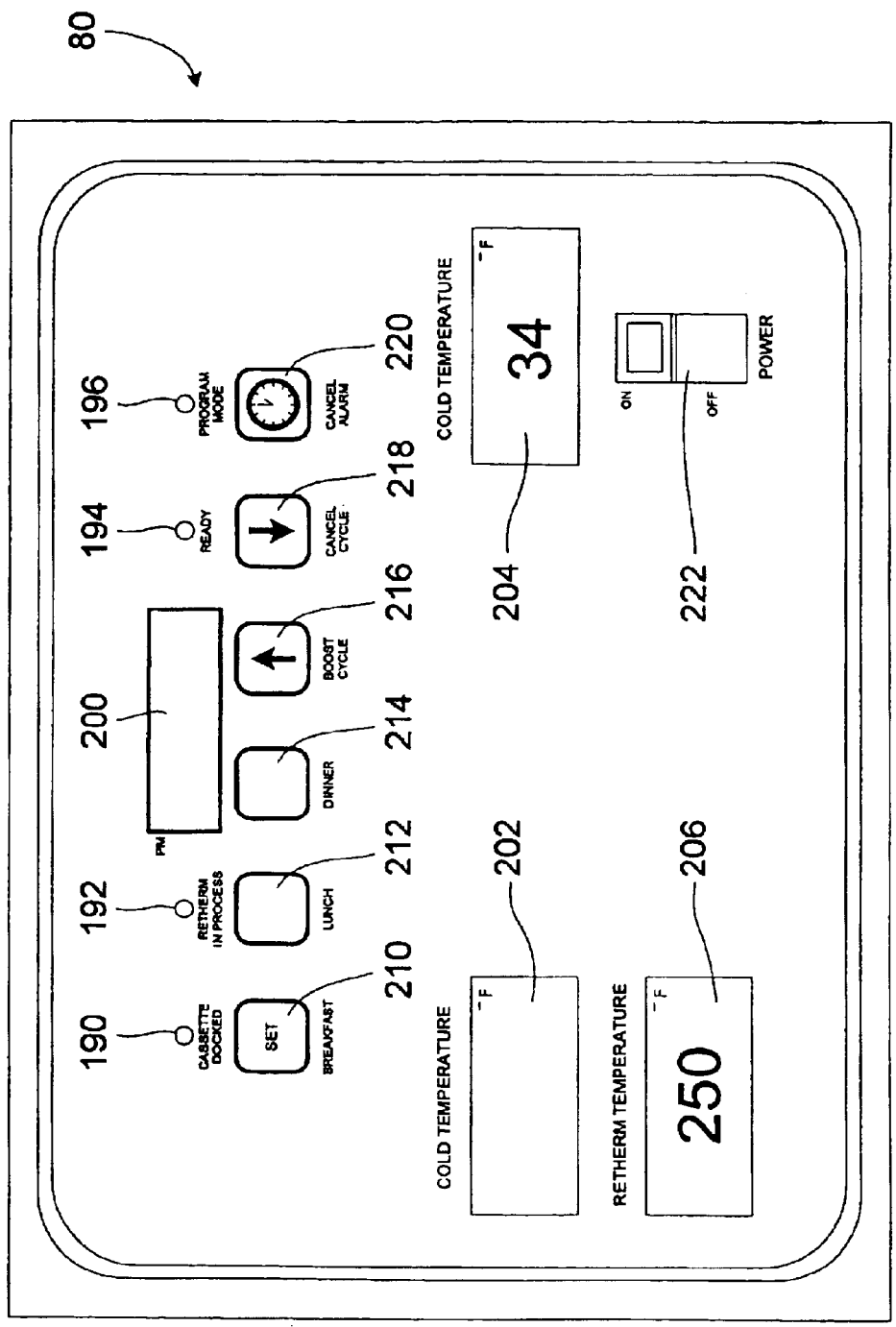
FIG. 9 is a plan view of a control panel for the rethermalization unit of FIG. 2.

With reference to FIG. 9, there is shown a preferred embodiment of the control panel 80. The control panel 80 is preferably mounted on the door 40 of the systems compartment 26 and includes a plurality of indicator lights, displays and user interactive buttons.

For example, in a preferred embodiment, the indicator lights include a "cassette docked" indicator light 190, a "retherm in process" indicator light 192, a "ready" indicator light 194, and a "program mode" indicator light 196.

The light 190 is lit when the sensor 150 senses the presence of the cassette 16 in the compartment 24 when the hot side is undergoing rethermalization, when the meals are ready to be served. The light 196 is lit during programming of the unit 12, as explained below. Preferred displays are liquid crystal displays such as "program mode" or "PM"

display 200, "cold temperature" displays 202 and 204, and "retherm temperature" display 206.

The display 202 displays the temperature of the hot side H during cold cycles thereof as obtained via the thermal monitor 180, and the display 206 displays the temperature of the hot side H during retherm cycles thereof as obtained via the thermal monitor 180. The selection of the output of the monitor 180 as between the displays 202 and 206 is electrically controlled to correspond to the current cycle. The display 204 displays the temperature of the cold side C as obtained via the thermal monitor 182.

Preferred interactive buttons include "set/breakfast" button 210, "lunch" button 212, "dinner" button 214, "↑/boost cycle" button 216, "↓/cancel cycle" button 218, and "clock/cancel alarm" button 220, and "on/off power" switch 222. These buttons enable programming, manual operation, and other interaction as described below.

The control panel 80 and associated control system 74 cooperate to enable desired operation of the rethermalization unit 12. In this regard, it is noted that the rethermalization unit 12 receives the cassette 16 containing trays of preferably initially chilled foods and holds them at a refrigerated temperature until just before meal service time. The unit is intended to be used to serve, sequentially store, and rethermalize meals such as for breakfast, lunch and dinner.

At a preferably predetermined time, the control system 74 automatically initiates a rethermalization phase wherein the heating system is activated. The configuration of the trays and the cassette physically divide the compartment 24 into its hot side H and cold side C so that heat is applied to the hot side and cold is applied to the cold side.

Returning to FIG. 9, the control system 74 may be initially programmed to default settings such as meal times and the like. The control panel 80 enables alteration of such settings and other input for enabling control over the operation of the unit 12.

For the purpose of example, a sequence will be described to illustrate operation of the unit 12 which is pre-programmed from the starting point of rethermalizing breakfast trays. Initially, the PM display 200 is on and the display will show "SP01" (which stands for "set-point #1, breakfast start time") and then "7:00" with the minutes ":00" flashing. The "↑" and "↓" buttons 216 and 218 may be used to change the minutes portion to a desired minute that the breakfast automatic rethermalization cycle will start. The display 200 may preferably include "am" and "pm" indicia or otherwise distinguish between am and pm times.

The cancel alarm button 220 may be pressed to change from "minutes" to hours" and the "↑" and "↓" buttons 216 and 218 used to change the hour of the breakfast auto-retherm cycle. Next, the "set/breakfast" button 210 may be pressed to save and record the start time of the breakfast auto-retherm cycle, and the display will show "SP02," which is the length of time of the breakfast auto-retherm cycle.

The "SP02" will disappear and "00" will appear as the default length of time of the breakfast auto-retherm cycle. The "↑" and "↓" buttons 216 and 218 are used to set the length that the breakfast auto-retherm cycle will last. The "set/breakfast" button 210 may be pressed to save and record the duration of the breakfast auto-retherm cycle, and the display will show "SP03," which is the time when the lunch auto-retherm cycle will start.

The "SP03" will disappear and "12:00" will appear with the minutes ":00" flashing. The minutes and hour may be adjusted in a manner similar to that described above by use of the "↑" and "↓" buttons 216 and 218 and the "cancel alarm" button 220. The "set" button 210 may be pressed to save and record the start time of the lunch auto-retherm cycle, and the display will show "SP04," which is the duration of the lunch auto-retherm cycle.

The "SP04" will disappear and "00" will appear as the default length of time of the lunch auto-retherm cycle. The "↑" and "↓" buttons 216 and 218 are used to set the length that the lunch auto-retherm cycle will last. The "set" button 210 may be pressed to save and record the duration of the lunch auto-retherm cycle, and the display will show "SP05," which is the time when the dinner auto-retherm cycle will start.

The "SP05" will disappear and "6:00" will appear with the minutes ":00" flashing. The minutes and hour may be adjusted in a manner similar to that described above by use of the "↑" and "↓" buttons 216 and 218 and the "cancel alarm" button 220. The "set" button 210 may be pressed to save and record the start time of the dinner auto-retherm cycle, and the display will show "SP06," which is the duration of the dinner auto-retherm cycle.

The "SP06" will disappear and "00" will appear as the default length of time of the dinner auto-retherm cycle. The "↑" and "↓" buttons 216 and 218 are used to set the length that the dinner auto-retherm cycle will last. The "set" button 210 may be pressed to save and record the duration of the dinner auto-retherm cycle, and the display will show "SP07," which is the minimum probe temperature of food monitor probe 70 before cool down will be initiated.

The "SP07" will disappear and "110" will appear and flash. The minimum food temperature may be adjusted in a manner similar to that described above by use of the "↑" and "↓" buttons 216 and 218 and the "cancel alarm" button 220. The "set" button 210 may be pressed to save and record the temperature information, and the display will show "SP09," which is the duration that the high temperature alarm delay is to last. That is, the delay in initiating cooling of the compartment 24 if the cooling delay system 58 having resistive thermal detector 162, described above, indicates that the temperature within the compartment 24 exceeds a predetermined threshold temperature. SP08 is a reserved set point for custom applications.

The "SP09" will disappear and "00" will appear as the default length of time of delay. The "↑" and "↓" buttons 216 and 218 are used to set the length that the delay will last. The "set" button 210 may be pressed to save and record the delay, and the display will show "SP10," which is the system time.

The "SP10" will disappear and "12:34" will appear and flash. The system time may be adjusted, preferably to the current time, in a manner similar to that described above by use of the "↑" and "↓" buttons 216 and 218 and the "cancel alarm" button 220. The "set" button 210 may be pressed to set the time, and the display will show "SP11," which is the refrigeration hold time, i.e., the duration that refrigeration will be applied to the cold side C after a rethermalization cycle has ended. That is, if the food is not served immediately after the retherm cycle, refrigeration may be applied to the cold side to maintain the cold foods chilled even though heat is not being applied to the hot side C.

The "SP11" will disappear and "30" will appear and flash. The refrigeration hold time may be adjusted in a manner similar to that described above by use of the "↑" and "↓" buttons 216 and 218. The "set" button 210 may be pressed to save and record the refrigeration hold time, and the display will show "SP12," which is the duration of the boost cycle, i.e., additional heating time to boost the temperature of the food if the food monitor probe 70 indicates that the food is yet to a desired temperature.

The "SP12" will disappear and "5" will appear and flash. The boost time may be adjusted in a manner similar to that described above by use of the "↑" and "↓" buttons 216 and 218. The "set" button 210 may be pressed to set the time, and the display will show "SP13," which is the duration of a preheat cycle. That is, if desired, some initial preheating of the hot side H may be accomplished prior to initiation of the retherm cycle.

The "SP13" will disappear and "10" will appear and flash. The preheat time may be adjusted in a manner similar to that described above by use of the "↑" and "↓" buttons 216 and 218. The "set" button 210 may be pressed to save and record the preheat time, and the display will show "SP14," which is the duration of the breakfast retherm cycle if manually initiated.

The "SP14" will disappear and 00" will appear and flash. The retherm time may be adjusted in a manner similar to that described above by use of the "↑" and "↓" buttons 216 and 218. The "set" button 210 may be pressed to set the time, and the display will show "SP15," which is the duration of the lunch retherm time if manually initiated.

The "SP15" will disappear and 00" will appear and flash. The retherm time may be adjusted in a manner similar to that described above by use of the "↑" and "↓" buttons 216 and 218. The "set" button 210 may be pressed to set the time, and the display will show "SP16," which is the duration of the dinner retherm time if manually initiated.

The "SP16" will disappear and 00" will appear and flash. The retherm time may be adjusted in a manner similar to that described above by use of the "↑" and "↓" buttons 216 and 218. The "set" button 210 may be pressed to set the time and exit the program mode.

Rethermalization can be activated either automatically or manually. Automatic mode is initiated by turning on the power switch 222. To override or initiate manual operation or both, the appropriate manual start button for the breakfast, lunch and dinner meals (button 210, 212, and 214) may be pressed.

Automatic retherm cycles begin with a preheat cycle (if time other than 0 is selected) and the indicia "pre" is displayed in the display 200. At the end of the preheat cycle, the retherm cycle automatically begins with a timer countdown corresponding to the remaining duration of the cycle displayed in the display 200.

At the end of the cycle, the alarm 68 is preferably sounded, ready light 194 lit, the indicia "serv" displayed in display 200, and any hold cycle activated and the hold time duration displayed in display 200. The "cancel alarm" button 220 may be pressed to silence the alarm and, if hold time is not needed, the "cancel cycle" button 218 pressed to cancel the cycle.

To perform a sample temperature check of a food item in the cold side C, the probe 70 may be inserted into the food item and the "cancel cycle" button 218 pressed to display the temperature reading on the display 200. The display is preferably visible for about 5 seconds, and the "set" button 210 pressed to record the temperature information.

To perform a sample temperature check of a food item in the hot side H, the probe 70 may be inserted into the food item and the "cancel alarm" button 220 pressed to display the temperature reading on the display 200. The display is preferably visible for about 5 seconds, and the "set" button 210 pressed to record the temperature information. If additional heating is desired, the "boost cycle" button 216 may be pressed.

Food Trays 14

With reference to FIGS. 10a–10c, a preferred tray 14 for use with the system 10 and cassette 16 of FIG. 10 is bisected to hold both hot and cold food items. The tray 14 includes a cold food side 230 which is loaded with cold food items and a hot food side 232 which is loaded with hot food items. At the midpoint of the tray 14 is a flat ridge 234 which enables the tray 14 to slide into a receiver that is created between dividers of the cassette 16 and maintain thermal separation between the hot side H and cold side C of the compartment 24.

With the tray loaded cassette in the compartment 24, cold food items that have been loaded onto the cold side 230 of the tray 14 are positioned within the cold side C of the compartment 24 and hot food items on the hot food side 232 are positioned in the hot side H of the compartment 24.

Tray Cassette 16

Turning now to FIGS. 11–16, the cassette 16 is preferably substantially rectangular in configuration and sized to be received within the compartment 24. The cassette 16 includes corner vertical members 240, 242, 244, and 246 center vertical member 248, upper frame 250, lower frame 252, upper horizontal members 254, 256, lower horizontal members 258, 260, hot side tray supports 262, cold side tray supports 264, and front column dividers 266 and rear column dividers 268.

Slidable latch arms 269 are preferably provided on the members 242 and 244 for engaging portions of the dolly 18 during transport. The portion 162 of the cassette 16 described in connection with the sensor 150 (FIG. 8b) may be provided by any upper portion of the cassette, such as portions of the frame 250 or the members 254, 256 or the topmost dividers 266/268 so long as the sensor 150 is positioned to be activated when the cassette is in the compartment 24.

The opposite ends of the members 240–246 are preferably secured to the upper and lower frame members as by welding to render a substantially rigid rectangular frame. The horizontal members 254–260 and tray supports are preferably attached to the frame as by fasteners such as bolts and screws and the like.

Figure 11:
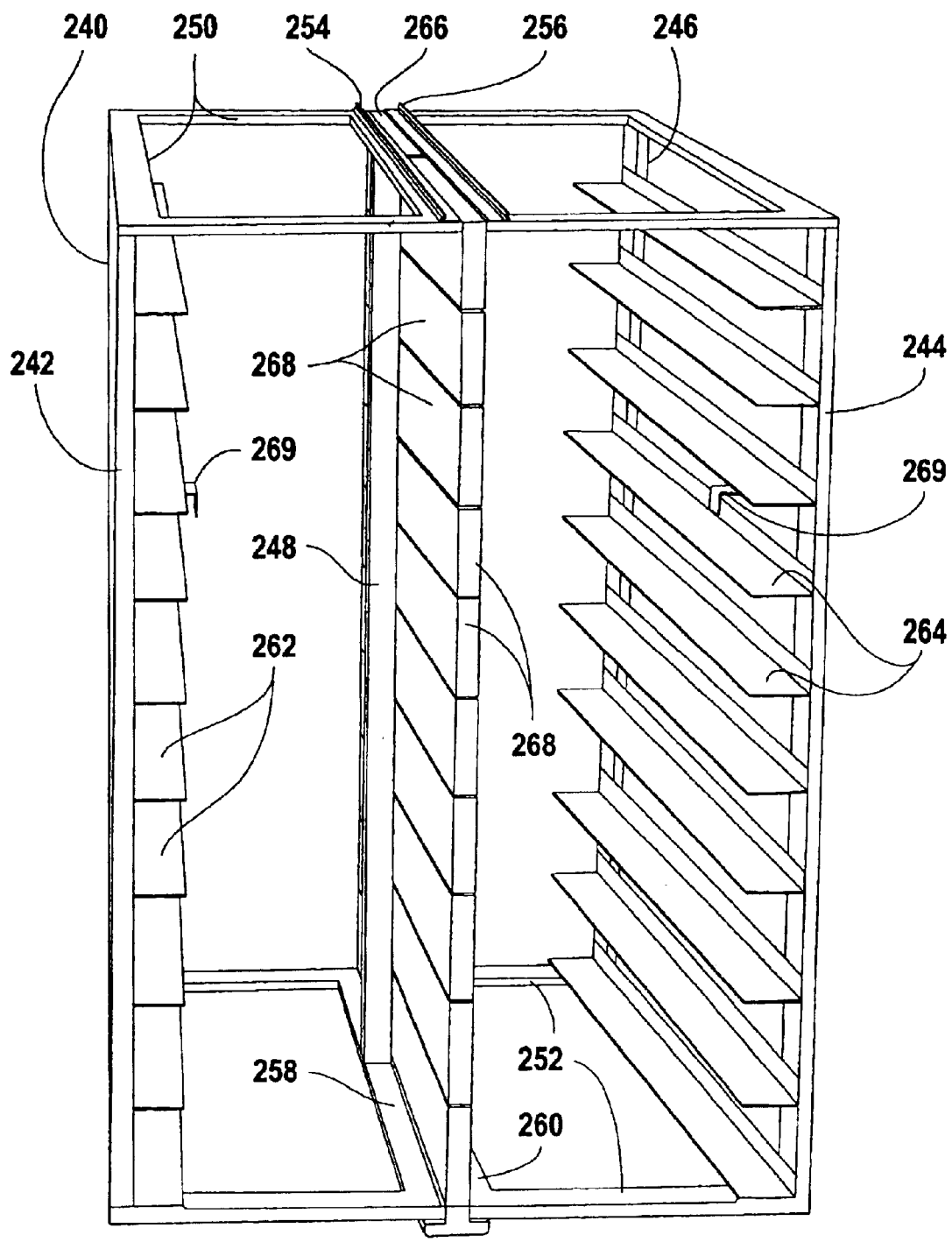
FIG. 11 is a perspective view of a cassette for use in the system of FIG. 1.
Figure 12:
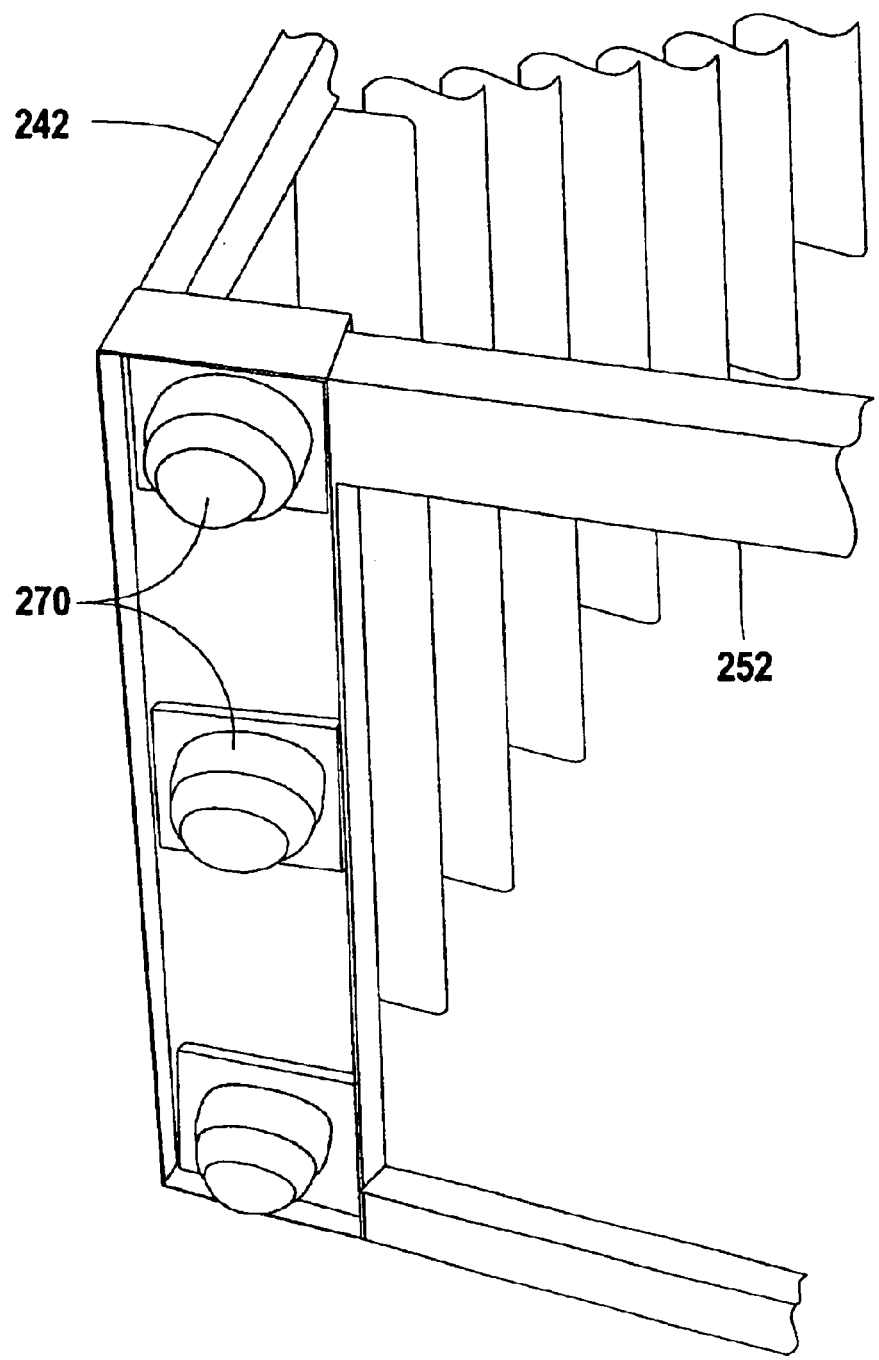
FIG. 12 is a close-up view showing rollers on the bottom of the cassette of FIG. 11.

The cassette 16 shown in FIG. 11 is configured to receive two columns of the trays 14, as best seen in FIG. 1. The cassette 16 is preferably initially received on the dolly 18 and loaded with trays 14 in the institutional kitchen. The cassette 16 is then docked to an enclosed transport 20 or the unit 12 and the tray-loaded cassette 16 transferred thereto. To facilitate transfer of the cassette 16, a plurality of rollers 270 are preferably located along opposite sides of the bottom of the lower frame 252 and aligned with the tray supports 262 and 264 (FIG. 12).

The dividers 266 and 268 are configured to cooperate with the trays 14 to snugly receive them and to provide a thermal barrier between the cold side C of the compartment 24 and the hot side H of the compartment 24. In this regard, it is noted that the flat ridges 234 of the trays 14 are configured to slide into a receiver 272 that is created between immediately adjacent ones of the dividers 266 (or 268) of a column as shown in FIGS. 13 and 14, so that each tray 14 is supported by the lower divider 266 or 268 and the corresponding tray support 262 and 264.

Figures 13, 14:
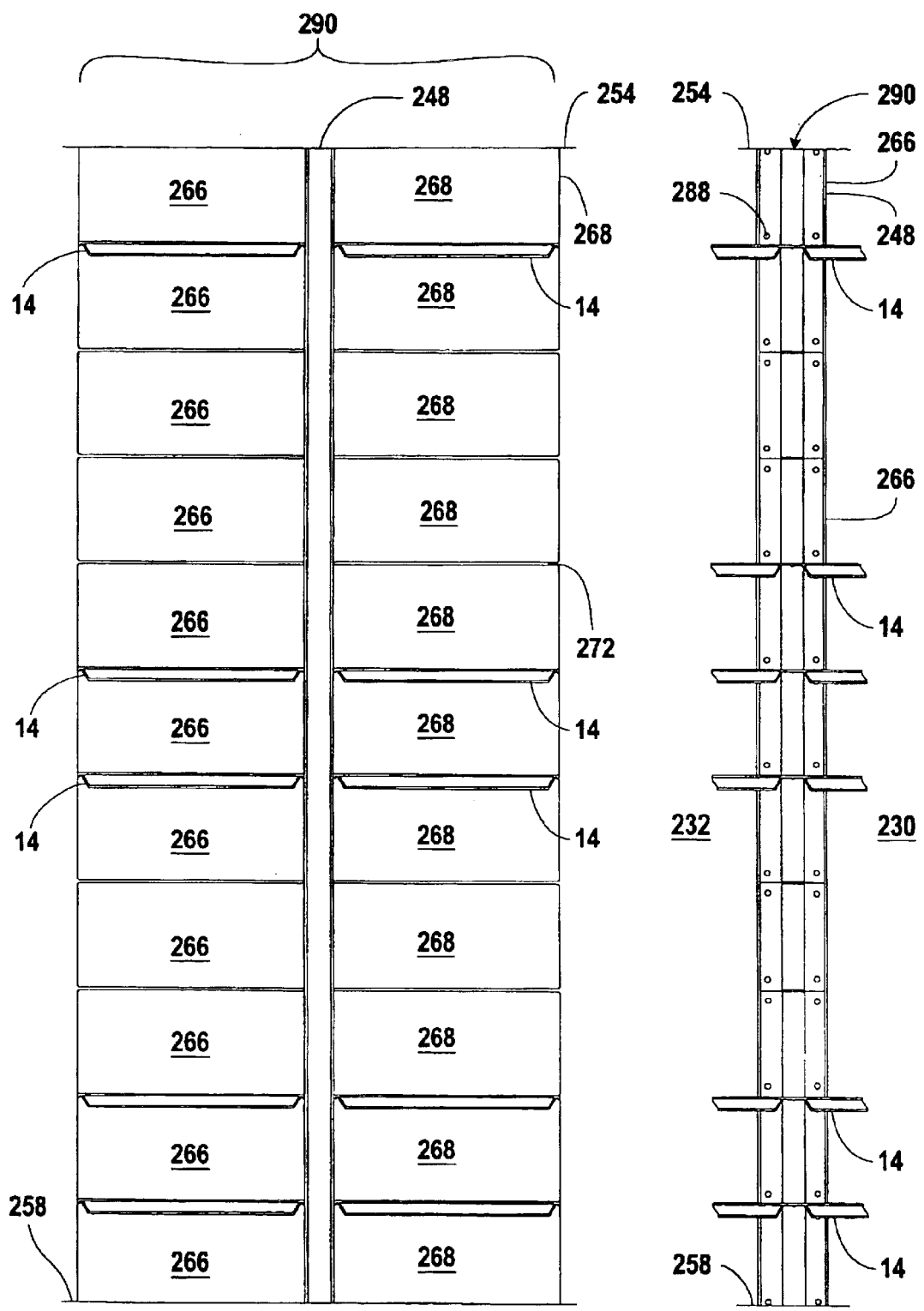
FIG. 13 is a side view of the cassette of FIG. 11.
FIG. 14 is a frontal view showing a thermal barrier portion of the cassette of FIG. 11.

As shown in the detailed view of FIG. 14, the tray ridge 234 is configured to be received by the receiver 272, thus maintaining thermal separation between the hot and cold sides of the compartment 24. With the tray 14 in place, cold food items that have been loaded onto the cold food side 230 of the tray 14 are positioned within the cold side C of the compartment 24 and hot food items on the hot food side 232 are positioned in the hot side H of the compartment 24. The cassette 16 is preferably configured to hold twenty of the trays 14, in two columns of ten each.

Each divider 266 (and 268) is substantially identical to one another and the dividers 266 identical to the dividers 268. As FIGS. 15a–e illustrate, each divider 266 is formed from two symmetrical members 280a and 280b as shown, where one of the members 280b is rotated 180 degrees relative to the position of the other member attachment points 282 with an appropriate fastener, such as a screw 284, to form the divider 266 as illustrated in FIGS. 15c and 15e. Preferably, each divider member 280a, 280b is formed as a single part from a thermoplastic material, such as GE ULTEM.TM., to withstand both hot and cold temperatures.

The divider 266 includes a flange 286 having a plurality of holes 288 through which appropriate fasteners, such as screws, are inserted to attach the flange 286 to a member 248 (FIGS. 13 and 14) located at the center of the cassette 16. Each divider 266 is attached to member 248 immediately adjacent another divider 266 to form a vertical array of dividers that make up a thermal barrier 290, as illustrated in FIGS. 13 and 14. The receiver 272 between each divider 266 (or 268) is created by forming a flange 286 with a small amount of overhang, as generally indicated at 292 in FIG. 15a.

Figure 15A:
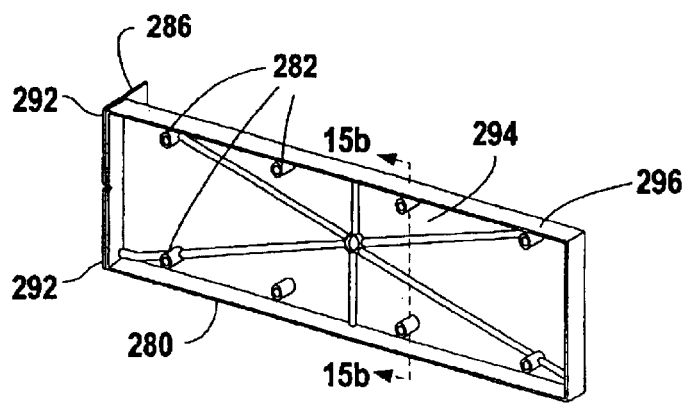
FIG. 15a–e show various views of components of the thermal barrier of the cassette of FIG. 11.
Figure 15B:
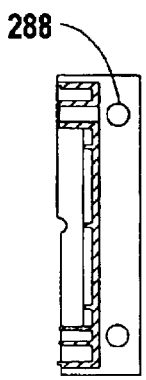
Figure 15C:
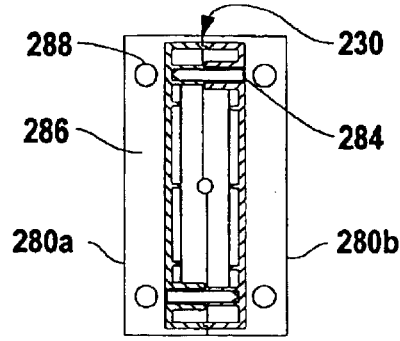
Figure 15D:
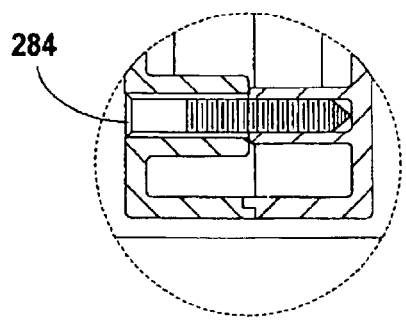
Figure 15E:
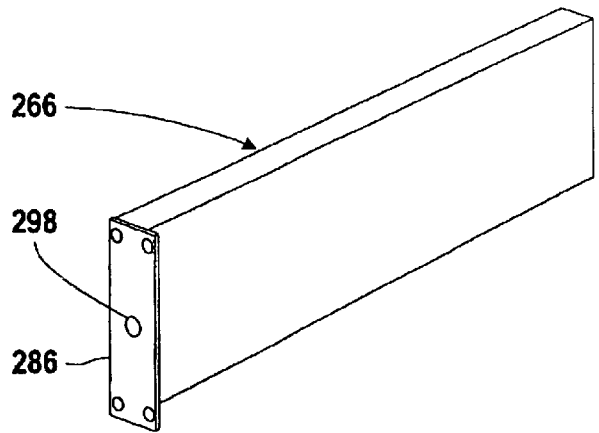

With further reference to FIG. 15a, each divider member 282a, 282b includes a vertical support member 294 connected at one edge to the flange 292. At the remaining three edges of the vertical support member 294 is a continuous lip 296 which contacts the lip 296 of an adjoining divider member 282a, 282b so that when the two divider members 282a, 282b are attached to each other, a volume is defined there between. To provide insulation for the thermal barrier 290, the volume defined by each assembled divider 266 (o 268) is filled with a urethane foam which creates a formed in place insulating barrier at each divider. The urethane foam is preferably injected into the divider 266 (or 268) prior to attachment to member 248 via a foam entry hole 298 formed at the flange 286. Alternatively, vertical 248 is configured to enable each divider to be filled after it is attached to the vertical member 248.

Dolly 18

Figure 17:
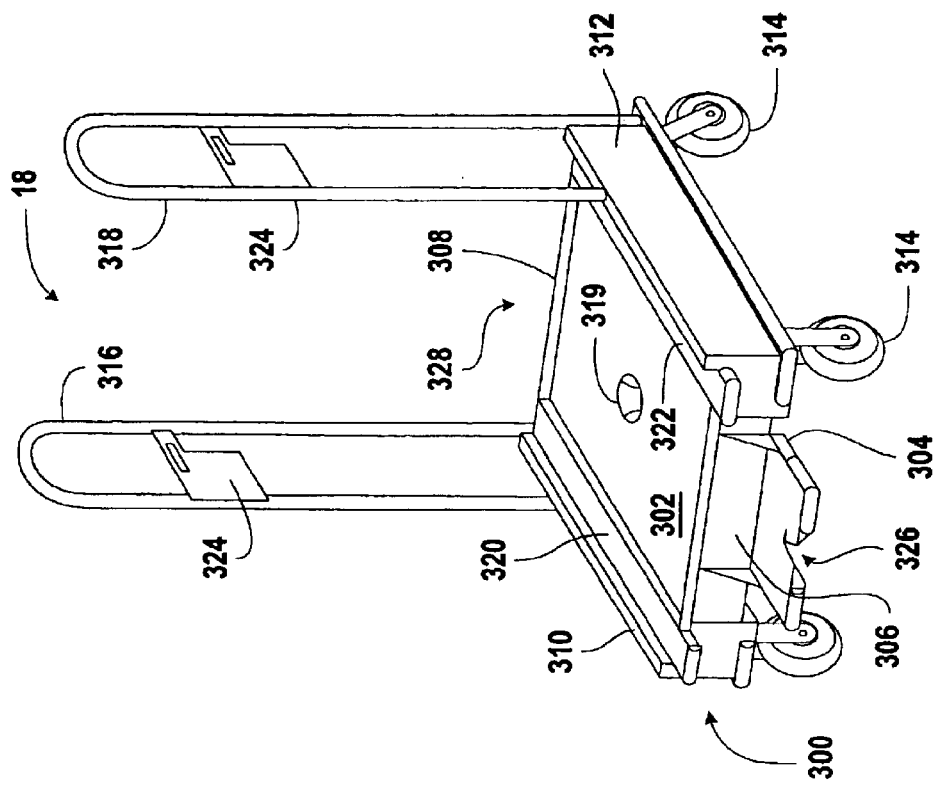
FIG. 17 is a perspective view showing a dolly without the cassette.
Figure 16:
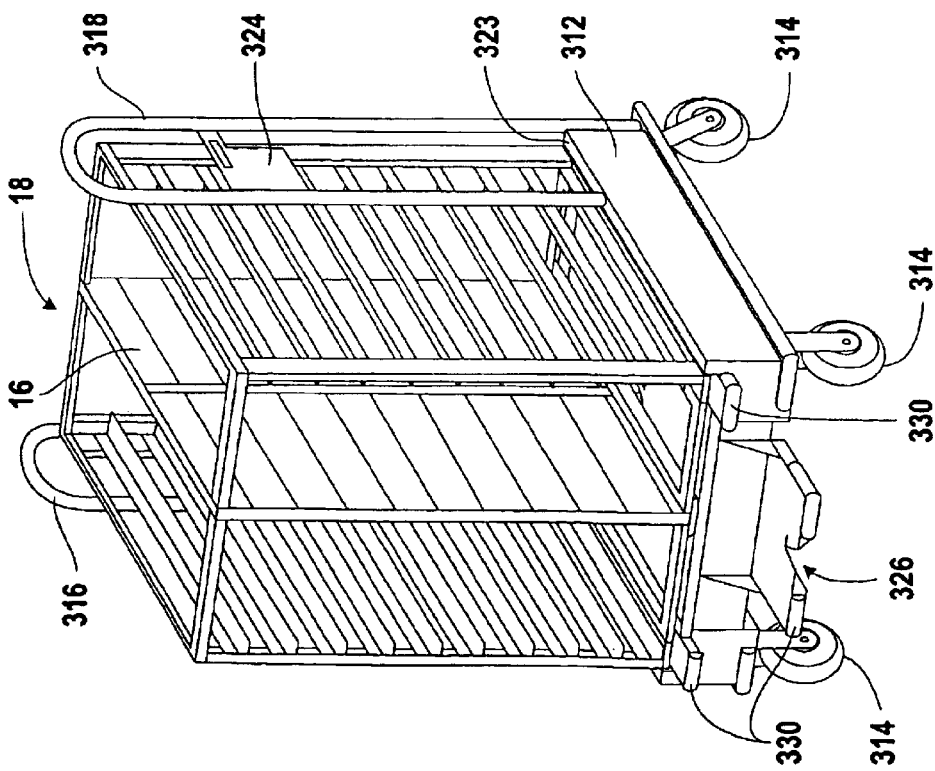
FIG. 16 is a perspective view showing a dolly holding a cassette.

Turning to FIGS. 16 and 17, there is shown a preferred embodiment of the dolly 18. The dolly 18 preferably includes a base 300 having an upper surface 302, an opposite lower surface 304, front end 306, rear end 308, and opposite sides 310 and 312. Wheels 314 are preferably mounted to the surface 304 at each corner and U-shaped arms 316 and 318 extend upwardly from the sides 310 and 312, respectively. Aperture 319 is preferably centrally located on the base 300 to allow water to drain from the base, such as after cleaning of the dolly.

The end 308 and the sides 310 and 312 preferably extend upwardly as lips from the base 300. On the interior of the base 300 adjacent the surface 302 and the sides 310 and 312, respectively, a pair of raised surfaces 320 and 322 extend the length of the base 300 for receiving the bottom of the cassette. The surfaces 320 and 322 will be understood to provide suitable rolling surfaces for the rollers 270 of the cassette and the lips defined by the ends 308, 310 and 312 as suitable stops to inhibit movement of the cassette 16. In addition, it will be understood that the surfaces 320, 322 are located so that they conform to the same height of the floor of the compartment 24 of the unit (and the floor of the transport) so as to facilitate transfer of the cassette. To facilitate accurate placement of the cassette 16 on the dolly 18 so that when the cassette 16 is unloaded the hot foods will be on the hot side H of the unit 12 and the cold foods on the cold side C of the unit, indicia such as red tape 323 is preferably provided along the appropriate side of the dolly 18 to indicate "hot" and/or blue tape provided along the opposite side. Similarly, red or blue tape or other suitable indicia may be provided at corresponding locations on the unit 12 and the cassette 16 (and the dolly 20) to facilitate correct placement of the cassette.

The cassette 16 may be loaded onto the dolly 18 as by positioning the cassette adjacent the front end 306 so that the rollers 270 may be rolled upon the surfaces 320 and 320 toward the end 308. The latch arms 269 may be slidably positioned to extend into apertures of receivers 324 correspondingly located on the arms 316 and 318 to help retain the cassette 16 on the dolly 18 during transport. The cassette 16 may be unloaded by removing it via the front end 306.

In this regard, it is preferable that the dolly 18 be configured for docking with the unit 12 (as well as the transport 20 as explained below) so that they are locked together during transfer of the cassette therefrom or thereto. In this regard, the dolly 18 preferably includes a latch system 326 located adjacent the front end 306 for engaging either of the latch pins 39 on the unit 12 to securely dock the dolly to the unit 12 (or the transport 20).

A preferred latch system 326 is provided by a rotary latch, model no. 8-240L available from Eberhard Mfg. Co., of Cleveland, Ohio. The latch system 326 is engaged with the pin 39 by urging the system 326 against the pin 39. The indicated rotary latch includes a rotating release member that is used to release the latch from its latch position. The system 326 is released from the pin as by a foot operated release lever 328 located at the rear of the dolly 18 (FIG. 1) and mechanically coupled to the release member. Rubber bumpers 330 are preferably located adjacent the front end 306 and the latch system 326 for contacting the unit 12 (or the transport 20) during docking.

Transport 20

With reference to FIG. 18, the transport 20 provides an enclosed compartment 340 accessible as by front door 342 and rear door 346. The transport is configured to maintain the cassette in an enclosed environment during transport of the tray-loaded cassette to the unit 12. In this regard, the door sets each preferably include a lock system 349.

Figure 23:
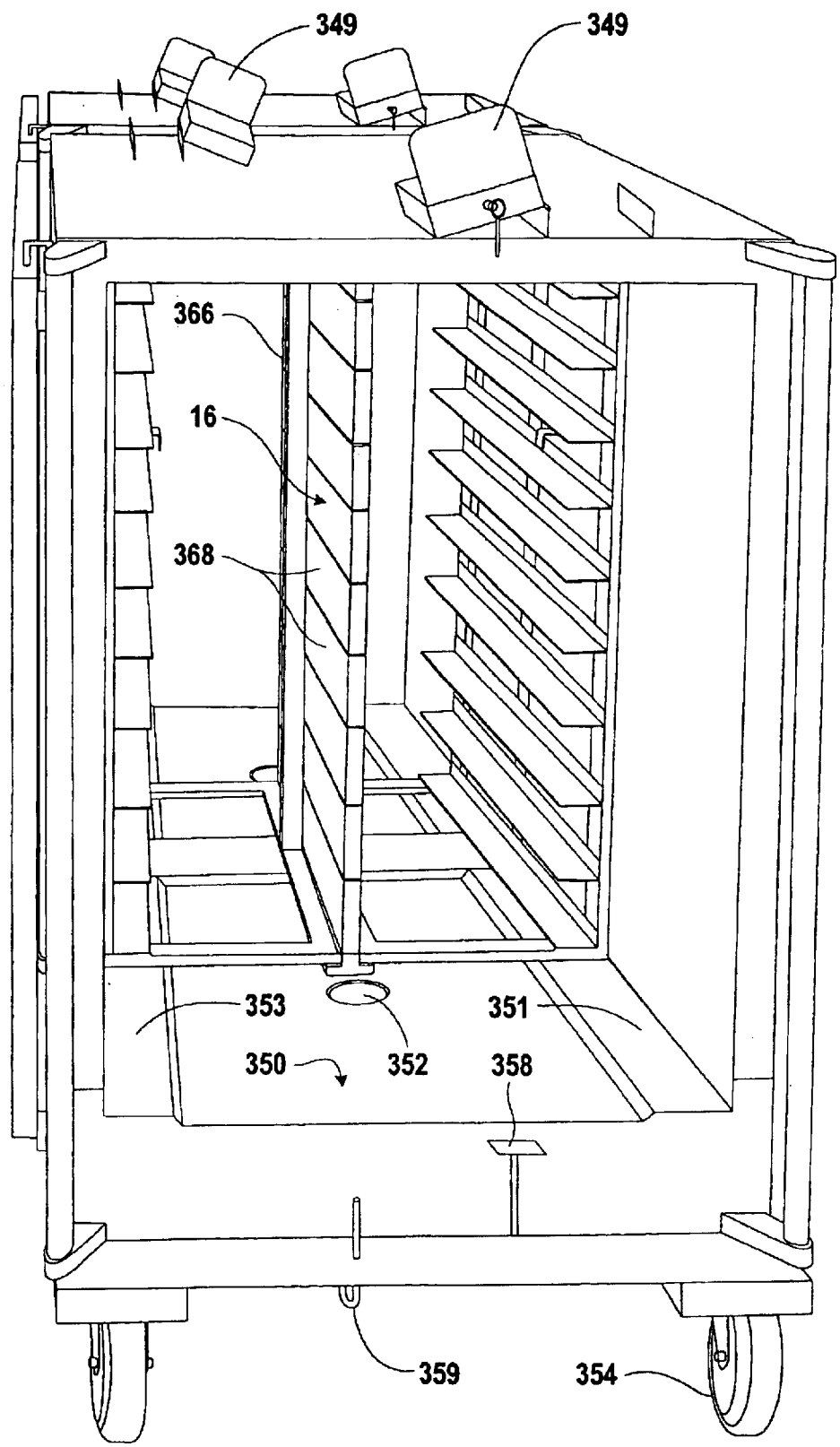
FIG. 23 is an end view of the transports of FIG. 22 showing a cassette being transferred from one of the transports to the other.

The compartment 340 has a substantially smooth floor 350 corresponding to the surface 302 of the dolly 18 and a drain aperture 352 to facilitate cleaning (FIG. 23). As also seen in FIG. 23, the a pair of raised surfaces 351 and 353 extend the length of the base floor 200 for receiving the bottom of the cassette in the manner described previously for raised surfaces 320 and 322 of the dolly 18.

The walls, floor, ceiling, and doors of the transport 20 are preferably of double wall construction having insulation there between when the distance over which transport is to occur will require more than about fifteen minutes of transport time. Alternatively, the transport may be relatively uninsulated for use with lesser transport times. The transport 20 includes a wheel 354 at each corner to render the transport mobile.

Figure 19:
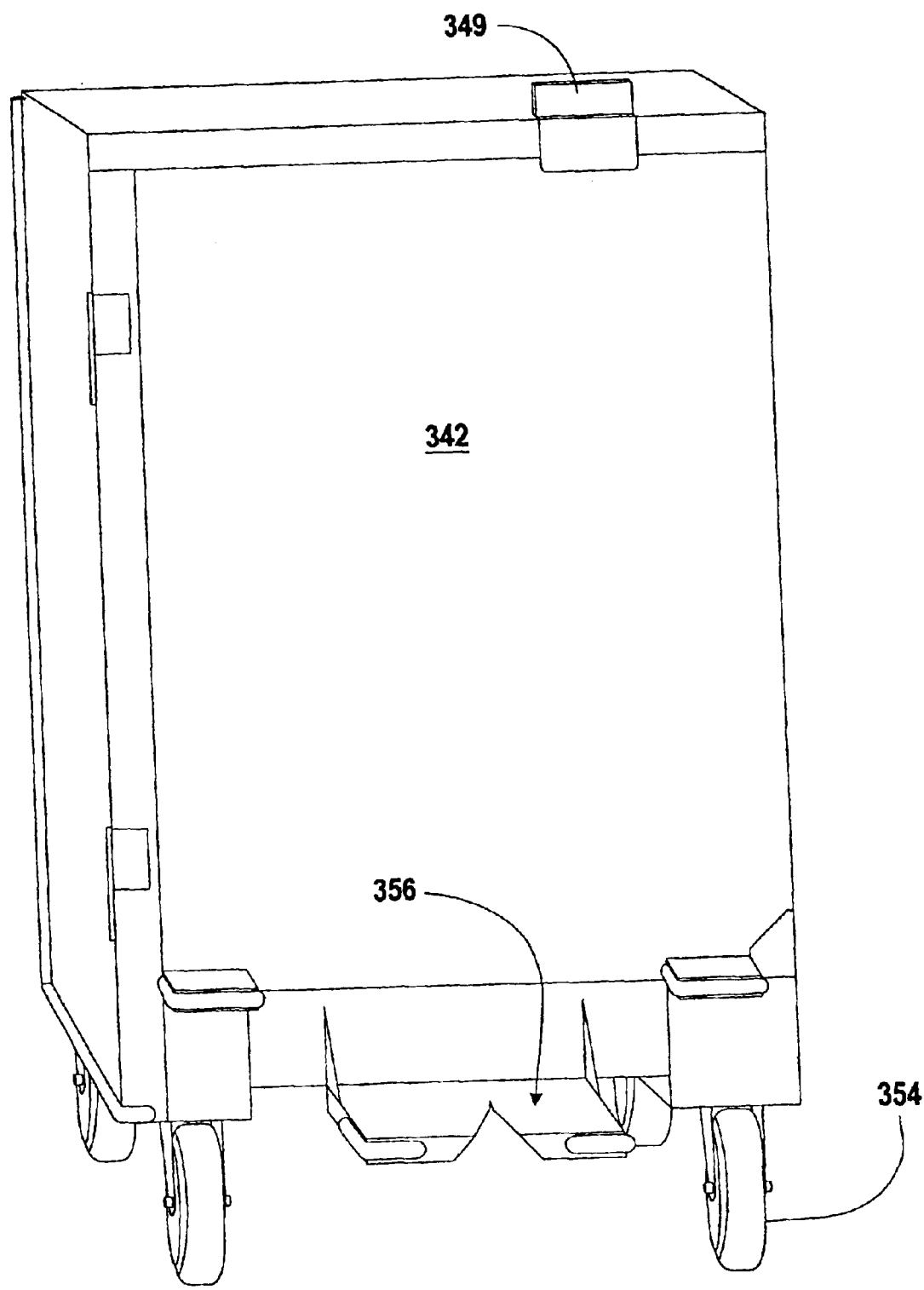
FIG. 19 is a front end view of the transport of FIG. 18.
Figure 20:
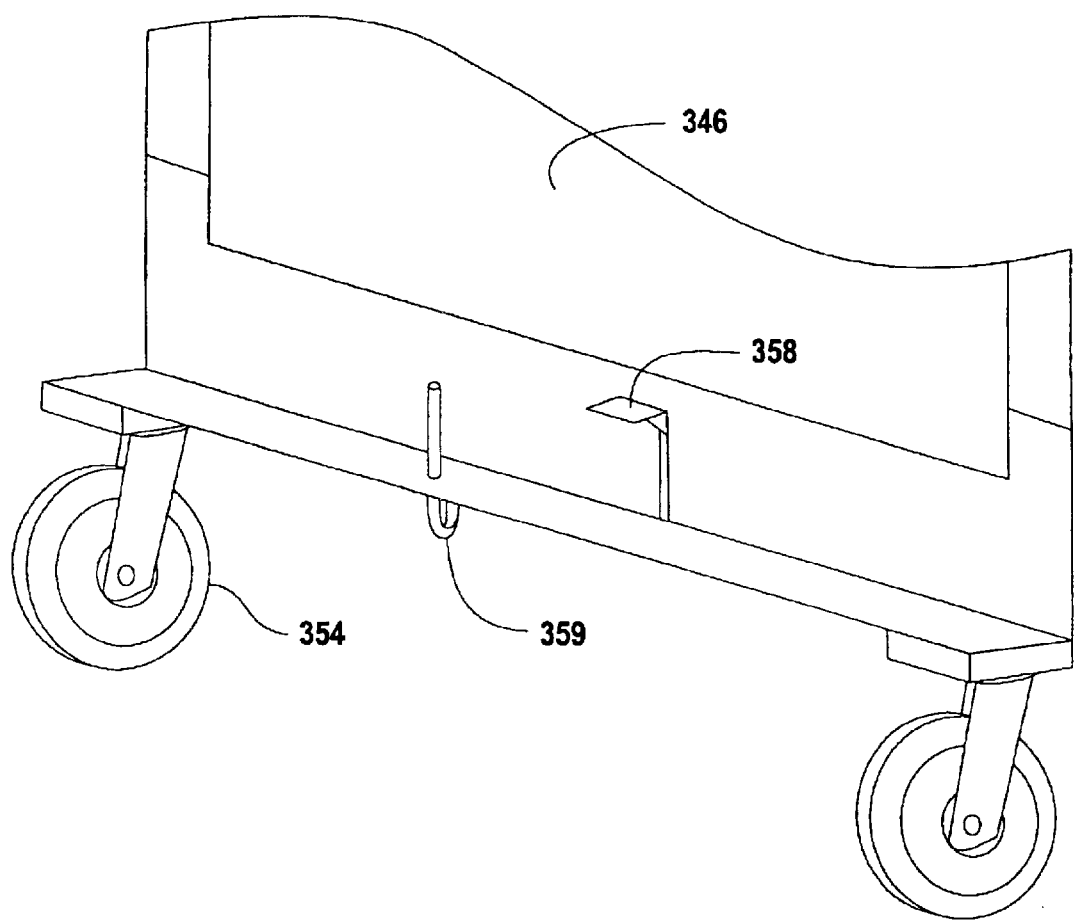
FIG. 20 is a close-up view of a portion of the rear of the transport of FIG. 18 showing a docking pin.

As seen in FIGS. 18 and 19, the front end of the transport (adjacent front door 342) includes a latch system 356 that is preferably identical to the latch system 326 described above in connection with the dolly 18 and including a foot operated release lever 358. In addition and with reference to FIG. 20, the opposite rear end of the transport 20 (adjacent the door 346) includes a latch pin 359 that is preferably identical to the latch pin 39 of the rethermalization unit 12. As seen in FIG. 20, the latch pin 359 is substantially U-shaped and attaches to the transport so that the "U" extends downwardly from the bottom of the transport and is exposed so as to be engagable by the latch system 356 or 326.

The provision of both a latch system 356 and a latch pin 359 on the transport 20 advantageously enables the transport 20 to be docked to the rethermalization unit, to the dolly 18, or to another transport 20.

Figure 21:
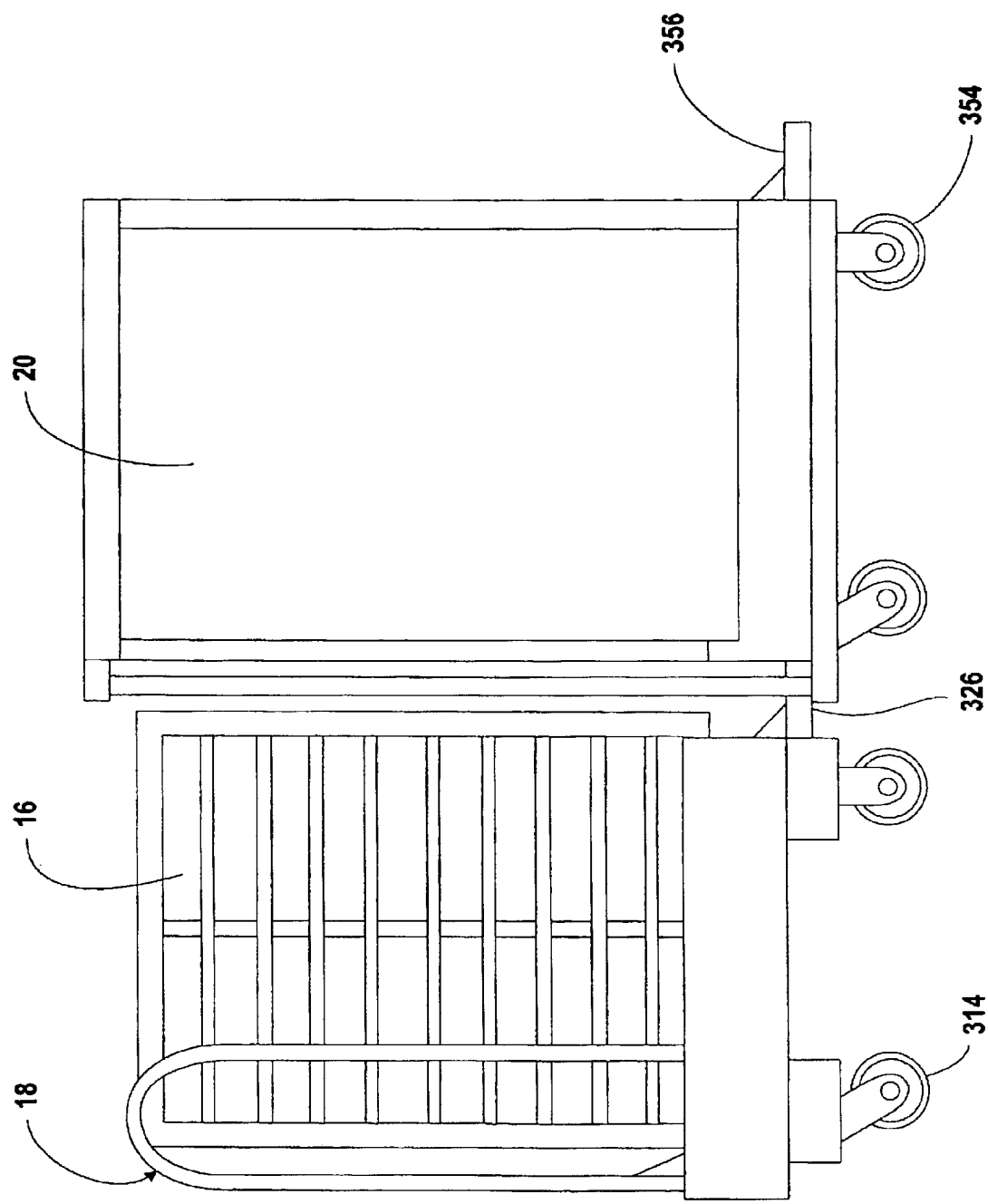
FIG. 21 is a side view showing a dolly docked to a transport for transfer of a cassette from the dolly to the transport.

For example, to minimize overcrowding in the kitchen area, it is preferable to have a single or small number of dollies 18 in the kitchen, but have a plurality of the transports 20 located near the kitchen in a storage room. The dolly 18 can be used to carry the cassette to the transport, and then the transport used to carry the cassette to the rethermalization unit. Likewise, the cassette loaded with food trays returning from service may be returned to the cleaning area in the same manner. FIG. 21 shows the dolly 18 docked to the transport 20 for transfer of the cassette 16 there between.

Figure 22:
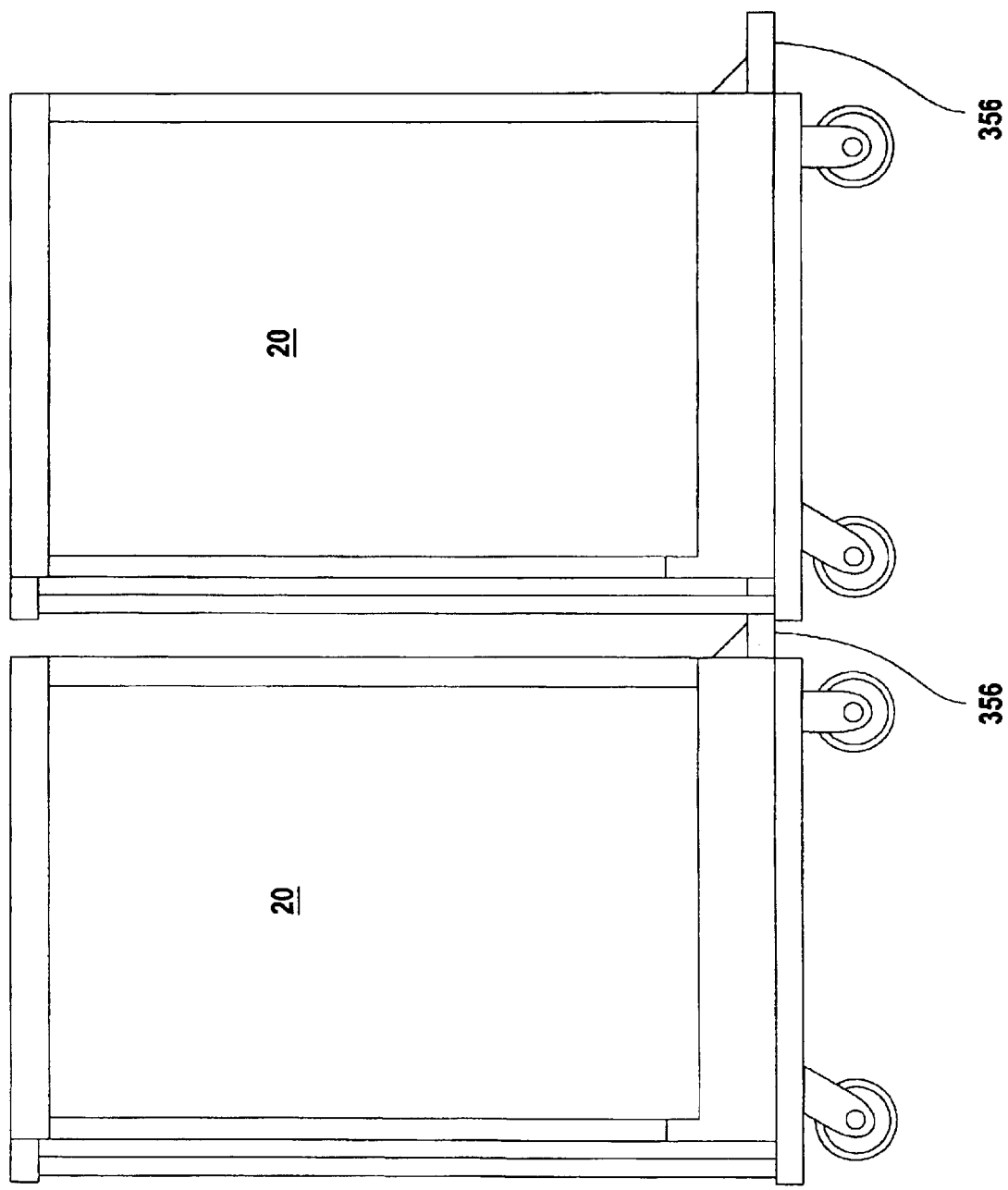
FIG. 22 is a side view showing two transports docked together.

It is also desirable to enable a plurality of the transports to be joined together for common travel, or to dock transports for transfer of the cassette there between. FIGS. 22 and 23 show a pair of the transports 20 docked together. If desired, adjoining doors between docked transports may be open or closed as desired.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a plurality of food trays, each tray having a cold food side and a hot food side; and a rethermalization unit having a compartment accessible via a first end and configured for being loaded with the trays, a first thermal system adjacent a first interior side of the rethermalization unit so that when the trays are within the compartment the hot food side of each tray is directly adjacent the first thermal system for thermal treatment thereby, a second thermal system adjacent a second interior side of the rethermalization unit so that when the trays are within the compartment the cold food side of each tray is directly adjacent the second thermal system for thermal treatment thereby, a compressor system operatively associated with the first and second thermal systems, and a microprocessor-based control system for operating the first and second thermal systems and the compressor system to effect desired thermal treatment of food on the food trays, wherein, the first thermal system includes a heating source, a refrigeration coil, and a blower for circulating heated air from the heating source and cold air from the refrigeration coil, the second thermal system includes first and second refrigeration coils and a blower for circulating cold from the first and second refrigeration coils, and the control system being operable so as to activate the refrigeration coil of the first thermal system and the first refrigeration coil of the second thermal system and to deactivate the second refrigeration coil of the second thermal system when the rethermalization system is operated to maintain both the hot food side and the cold food side of each tray at a desired cold temperature, and to deactivate the refrigeration coil of the first thermal system, activate the heating source of the first thermal system, and activate both the first and second refrigeration coils of the second thermal system when the rethermalization system is operated to heat the hot food side from the desired cold temperature to a desired hot temperature while simultaneously maintaining the cold food side at the desired cold temperature.

2. The system of claim 1, further comprising a cassette configured for receiving the plurality of the trays, the cassette including a plurality of spaced apart dividers, wherein the dividers are substantially vertically aligned with one another and spaced apart a distance from one another so as to define a receiver between each divider, each receiver being dimensioned so as to receive one of the food trays so that when the cassette is loaded with the plurality of trays, the dividers define a thermal barrier between the hot food side and the cold food side of each tray; and a cassette placement sensor located within the rethermalization unit and operatively associated with the control system for sensing initial placement of the cassette within the rethermalization unit, wherein the control system initiates operation of the first and second thermal systems when the cassette is placed in the rethermalization unit to maintain both the hot food side and the cold food side of each tray at a desired cold temperature.

3. The system of claim 2, wherein the rethermalization unit further includes a temperature monitor for monitoring the temperature of the compartment and operatively associated with the control system and the cassette placement sensor so that initiation of operation of the first and second thermal system is deactivated if the temperature of the compartment exceeds a predetermined threshold at the time the cassette is placed into the compartment.

4. The system of claim 1, further comprising a compressor system temperature monitor associated with the compressor system for sensing temperatures associated with the operation of the compressor system and operatively associated with the control system for inputting temperature information thereto relating to the compressor system, wherein when the temperature of the compressor system exceeds a predetermined value the control system generates a signal to cease operation of the compressor system.

5. The system of claim 1, further comprising a compressor system pressure monitor associated with the compressor system for sensing pressures associated with the operation of the compressor system and operatively associated with the control system for inputting pressure information thereto relating to the compressor system, wherein when the pressure of the compressor system exceeds a predetermined value the control system generates a signal to cease operation of the compressor system.

6. The system of claim 1, further comprising a cassette configured for receiving the plurality of the trays, the cassette including a plurality of spaced apart dividers, wherein the dividers are substantially vertically aligned with one another and spaced apart a distance from one another so as to define a receiver between each divider, each receiver being dimensioned so as to receive one of the food trays so that when the cassette is loaded with the plurality of trays, the dividers define a thermal barrier between the hot food side and the cold food side of each tray; and a portage unit configured for receiving the cassette and for transferring the cassette to the compartment and for removing the cassette from the compartment.

7. The system of claim 6, wherein the portage unit comprises an enclosed unit.

8. The system of claim 1, further comprising a cassette configured for receiving the plurality of the trays, the cassette including a plurality of spaced apart dividers, wherein the dividers are substantially vertically aligned with one another and spaced apart a distance from one another so as to define a receiver between each divider, each receiver being dimensioned so as to receive one of the food trays so that when the cassette is loaded with the plurality of trays, the dividers define a thermal barrier between the hot food side and the cold food side of each tray; and a first portage unit and a second portage unit, the first and second portage units each being configured for receiving the cassette and for transferring the cassette to the compartment and for removing the cassette from the compartment, wherein the rethermalization unit includes a first latch pin adjacent the compartment, the first portage unit has a first end including a first latch system releasably engageable with the first latch pin, and the second portage unit has first and second opposite ends, the first end of the second portage unit having a second latch system releasably engageable with the first latch pin and a second latch pin releasably engageable with the first latch system of the first portage unit.

9. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a plurality of food trays, each tray having a cold food side and a hot food side;

a cassette configured for receiving the plurality of the trays, the cassette including a plurality of spaced apart dividers, wherein the dividers are substantially vertically aligned with one another and spaced apart a distance from one another so as to define a receiver between each divider, each receiver being dimensioned so as to receive one of the food trays so that when the cassette is loaded with the plurality of trays, the dividers and the trays received in the receivers of the dividers define a thermal barrier between the hot food side and the cold food side of each tray;

a rethermalization unit having a compartment accessible via a first end and configured for receiving the cassette when it is loaded with the trays, a first thermal system having a heating source and a refrigeration source and located adjacent a first interior side of the rethermalization unit so that when the tray loaded cassette is received within the compartment the hot food side of each tray is directly adjacent the first thermal system for thermal treatment thereby, a second thermal system having first and second refrigeration sources and located adjacent a second interior side of the rethermalization unit so that when the tray loaded cassette is received within the compartment the cold food side of each tray is directly adjacent the second thermal system for thermal treatment thereby, a compressor system operatively associated with the first and second thermal systems, and a microprocessor-based control system for operating the first and second thermal systems and the compressor system to effect desired thermal treatment of food on the food trays, and a cassette placement sensor located within the rethermalization unit and operatively associated with the control system for sensing initial placement of the cassette within the rethermalization unit, wherein the control system initiates operation of the first and second thermal systems when the cassette is placed in the rethermalization unit to maintain both the hot food side and the cold food side of each tray at a desired cold temperature.

10. The system of claim 9, wherein the rethermalization unit further includes a temperature monitor for monitoring the temperature of the compartment and operatively associated with the control system and the cassette placement sensor so that initiation of operation of the first and second thermal system is deactivated if the temperature of the compartment exceeds a predetermined threshold at the time the cassette is placed into the compartment.

11. The system of claim 9, further comprising a compressor system temperature monitor associated with the compressor system for sensing temperatures associated with the operation of the compressor system and operatively associated with the control system for inputting temperature information thereto relating to the compressor system, wherein when the temperature of the compressor system exceeds a predetermined value the control system generates a signal to cease operation of the compressor system.

12. The system of claim 9, further comprising a compressor system pressure monitor associated with the compressor system for sensing pressures associated with the operation of the compressor system and operatively associated with the control system for inputting pressure information thereto relating to the compressor system, wherein when the pressure of the compressor system exceeds a predetermined value the control system generates a signal to cease operation of the compressor system.

13. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a plurality of food trays, each tray having a cold food side and a hot food side;

a cassette configured for receiving the plurality of the trays, the cassette including a plurality of spaced apart dividers, wherein the dividers are substantially vertically aligned with one another and spaced apart a distance from one another so as to define a receiver between each divider, each receiver being dimensioned so as to receive one of the food trays so that when the cassette is loaded with the plurality of trays, the dividers and the trays received in the receivers of the dividers define a thermal barrier between the hot food side and the cold food side of each tray;

a rethermalization unit having a compartment accessible via a first end and configured for receiving the cassette when it is loaded with the trays, a first thermal system having a heating source and a refrigeration source and located adjacent a first interior side of the rethermalization unit so that when the tray loaded cassette is received within the compartment the hot food side of each tray is directly adjacent the first thermal system for thermal treatment thereby, a second thermal system having first and second refrigeration sources and located adjacent a second interior side of the rethermalization unit so that when the tray loaded cassette is received within the compartment the cold food side of each tray is directly adjacent the second thermal system for thermal treatment thereby, a compressor system operatively associated with the first and second thermal systems, and a microprocessor-based control system for operating the first and second thermal systems and the compressor system to effect desired thermal treatment of food on the food trays, and a compressor system temperature monitor associated with the compressor system for sensing temperatures associated with the operation of the compressor system and operatively associated with the control system for inputting temperature information thereto relating to the compressor system, wherein when the temperature of the compressor system exceeds a predetermined value the control system generates a signal to cease operation of the compressor system.

14. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a plurality of food trays, each tray having a cold food side and a hot food side;

a cassette configured for receiving the plurality of the trays, the cassette including a plurality of spaced apart dividers, wherein the dividers are substantially vertically aligned with one another and define a receiver between each divider, each receiver being dimensioned so as to receive one of the food trays so that when the cassette is loaded with the plurality of trays, the dividers and the trays received in the receivers of the dividers define a thermal barrier between the hot food side and the cold food side of each tray;

a rethermalization unit having a compartment accessible via a first end and configured for receiving the cassette when it is loaded with the trays, a first thermal system having a heating source and a refrigeration source and located adjacent a first interior side of the rethermalization unit so that when the tray loaded cassette is received within the compartment the hot food side of each tray is directly adjacent the first thermal system for thermal treatment thereby, a second thermal system having first and second refrigeration sources and located adjacent a second interior side of the rethermalization unit so that when the tray loaded cassette is received within the compartment the cold food side of each tray is directly adjacent the second thermal system for thermal treatment thereby, a compressor system operatively associated with the first and second thermal systems, and a microprocessor-based control system for operating the first and second thermal systems and the compressor system to effect desired thermal treatment of food on the food trays, and a compressor system pressure monitor associated with the compressor system for sensing pressures associated with the operation of the compressor system and operatively associated with the control system for inputting pressure information thereto relating to the compressor system, wherein when the pressure of the compressor system exceeds a predetermined value the control system generates a signal to cease operation of the compressor system.

15. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a rethermalization unit having a compartment accessible via a first end, a first thermal system adjacent a first interior side of the rethermalization unit, a second thermal system adjacent a second interior side of the rethermalization unit, a compressor system operatively associated with the first and second thermal systems, and a microprocessor-based control system for operating the first and second thermal systems and the compressor system to effect desired thermal treatment of food on the food trays inside the compartment, and first and second portage units, the first and second portage units each being configured for receiving the cassette and for transferring the cassette to the compartment and for removing the cassette from the compartment, wherein the rethermalization unit includes a first latch pin adjacent the compartment, the first portage unit has a first end including a first latch system releasably engageable with the first latch pin, and the second portage unit has first and second opposite ends, the first end of the second portage unit having a second latch system releasably engageable with the first latch pin and a second latch pin releasably engageable with the first latch system of the first portage unit.

16. The system of claim 15, further comprising a plurality of the second portage units, wherein each of the second portage units is connectable to another of the second portage units via their respective latch systems and latch pins.

17. A method for rethermalizing food trays having a hot food side and a cold food side to maintain both the hot food side and the cold food side of each tray at a cold temperature for a desired period of time and thereafter heating the hot food side from the cold temperature to a hot temperature while simultaneously maintaining the cold food side at the cold temperature, the method comprising the steps of:

providing a plurality of food trays, each tray having a cold food side and a hot food side;

providing a rethermalization unit configured for being loaded with the trays, the rethermalization unit having a first thermal system including a heating source and a refrigeration source, and a second thermal system including first and second refrigeration sources, operating the rethermalization system to maintain both the hot food side and the cold food side of each tray at a desired cold temperature by activating the refrigeration source of the first thermal system and the first refrigeration source of the second thermal system and deactivating the second refrigeration source of the second thermal system; and operating the rethermalization system to heat the hot food side from the desired cold temperature to a desired hot temperature while simultaneously maintaining the cold food side at the desired cold temperature by deactivating the refrigeration source of the first thermal system, activating the heating source of the first thermal system, and activating both the first and second refrigeration sources of the second thermal system.

18. The method of claim 17, wherein the refrigeration sources comprise refrigeration coils.

19. A method for rethermalizing food trays having a hot food side and a cold food side to maintain both the hot food side and the cold food side of each tray at a cold temperature for a desired period of time and thereafter heating the hot food side from the cold temperature to a hot temperature while simultaneously maintaining the cold food side at the cold temperature, the method comprising the steps of:

providing a plurality of food trays, each tray having a cold food side and a hot food side;

providing a rethermalization unit configured for being loaded with the trays, the rethermalization unit having a thermal system to selectively provide heating and cooling to the unit, a cassette configured for receiving the plurality of the trays, and a cassette placement sensor for sensing initial placement of the cassette within the rethermalization unit, sensing when the cassette is initially placed in the rethermalization unit and initiating operation of the thermal system to maintain both the hot food side and the cold food side of each tray at a desired cold temperature when the cassette is placed in the rethermalization unit, and thereafter heating the hot food side of each tray to a desired hot temperature while substantially maintaining the cold food side of each tray at the desired cold temperature.

20. A method for handling food trays to be selectively refrigerated and rethermalized, the method comprising the steps of:

providing a plurality of food trays;

providing a cassette configured for receiving the plurality of the trays;

providing a rethermalization unit configured for being loaded with the food trays, providing a plurality of portage units selectively interconnectable to one another with each portage unit being configured for receiving the cassette and for transferring and removing the cassette from the rethermalization unit, loading the food trays on the cassette and loading the cassette onto a first one of the portage units;

interconnecting the portage unit loaded with the cassette to a second one of the portage units;

transferring the cassette loaded with the food trays from the first one of the portage units to the second one of the portage units while the portage units are interconnected; and connecting the second one of the portage units to the rethermalization unit and transferring the cassette loaded with the food trays from the second one of the portage units to the rethermalization unit.

21. A rethermalization system for food trays having a hot food side and a cold food side, the system comprising a first thermal system having a heating source and a refrigeration source; a second thermal system having first and second refrigeration sources; and a control system operable in one mode to activate the refrigeration source of the first thermal system and the first refrigeration source second thermal system, and operable in a second mode to activate the heating source of the first thermal system and the first and second refrigeration sources of the second thermal system.

22. A rethermalization system for use with food trays having a hot food side and a cold food side, the system being operable to maintain both the hot food side and the cold food side of each tray at a cold temperature and to heat the hot food side from the cold temperature to a hot temperature while simultaneously maintaining the cold food side at the cold temperature, the system comprising:

a rethermalization unit having a compartment accessible via a first end, a first thermal system adjacent a first interior side of the rethermalization unit, a second thermal system adjacent a second interior side of the rethermalization unit, a compressor system operatively associated with the first and second thermal systems, and a microprocessor-based control system for operating the first and second thermal systems and the compressor system to effect desired thermal treatment of food on the food trays inside the compartment, a cassette configured for receiving a plurality of food trays, and first and second portage units, the first and second portage units each being configured for receiving the cassette and for transferring the cassette to the compartment and for removing the cassette from the compartment, wherein the rethermalization unit includes a first latch member adjacent the compartment, the first portage unit has a first end including a first latch system releasably engageable with the first latch member, and the second portage unit has first and second opposite ends, the first end of the second portage unit having a second latch system releasably engageable with the first latch member and a second latch member releasably engageable with the first latch system of the first portage unit.

* * * * *